(12) United States Patent
Tsai et al.

(10) Patent No.: US 9,019,630 B2
(45) Date of Patent: Apr. 28, 2015

(54) LENS ASSEMBLY OF OPTICAL IMAGING SYSTEM

(71) Applicant: Largan Precision Co., Ltd., Taichung (TW)

(72) Inventors: Tsung-Han Tsai, Taichung (TW); Wei-Yu Chen, Taichung (TW)

(73) Assignee: Largan Precision Co., Ltd., Taichung (TW)

(*) Notice: Subject to any disclaimer, the term of this patent is extended or adjusted under 35 U.S.C. 154(b) by 264 days.

(21) Appl. No.: 13/655,345

(22) Filed: Oct. 18, 2012

(65) Prior Publication Data
US 2014/0049840 A1    Feb. 20, 2014

(30) Foreign Application Priority Data
Aug. 15, 2012   (TW) .............................. 101129618 A

(51) Int. Cl.
| | | |
|---|---|---|
| G02B 13/18 | (2006.01) | |
| G02B 3/02 | (2006.01) | |
| G02B 9/12 | (2006.01) | |
| G02B 1/04 | (2006.01) | |
| G02B 13/00 | (2006.01) | |
| G02B 13/06 | (2006.01) | |
| G02B 13/22 | (2006.01) | |

(52) U.S. Cl.
CPC G02B 1/04 (2013.01); G02B 13/00 (2013.01); G02B 13/06 (2013.01); G02B 13/18 (2013.01); G02B 13/22 (2013.01); G02B 13/0035 (2013.01)

(58) Field of Classification Search
CPC ........... G02B 13/18; G02B 15/17; G02B 9/12
USPC .................................................. 359/716, 784
See application file for complete search history.

(56) References Cited

U.S. PATENT DOCUMENTS

| 8,194,172 B2 | 6/2012 | Tang et al. |
|---|---|---|
| 8,213,097 B2 | 7/2012 | Tsai |

(Continued)

FOREIGN PATENT DOCUMENTS

| JP | 2008065305 | 3/2008 |
|---|---|---|
| JP | 2008070425 | 3/2008 |

(Continued)

OTHER PUBLICATIONS

Intellectual Property Office, Ministry of Economic Affairs, R.O.C., "Office Action", Mar. 17, 2014, Taiwan.

Primary Examiner — Alicia M Harrington
(74) Attorney, Agent, or Firm — Tim Tingkang Xia, Esq.; Morris, Manning & Martin, LLP

(57) ABSTRACT

A lens assembly of optical imaging system includes a first lens element, a second lens element, and a third lens element. The first lens element with positive refractive power has a convex object-side surface near an optical axis. The second lens element with negative refractive power has a concave object-side surface near the optical axis, and is made of plastic. The object-side surface and the image-side surface of the second lens element are aspheric. The third lens element with negative refractive power has an image-side surface being concave near the optical axis and convex away from the optical axis, and is made of plastic. The object-side surface and the image-side surface of the third lens element are aspheric.

23 Claims, 17 Drawing Sheets

(56) References Cited

U.S. PATENT DOCUMENTS

2009/0128927 A1* 5/2009 Chen et al. .................. 359/715
2010/0259838 A1* 10/2010 Tsai et al. .................... 359/716

FOREIGN PATENT DOCUMENTS

| JP | 2008134411 A | 6/2008 |
| JP | 2009265528 | 11/2009 |

* cited by examiner

FIG.1B
FIG.1C
FIG.1D

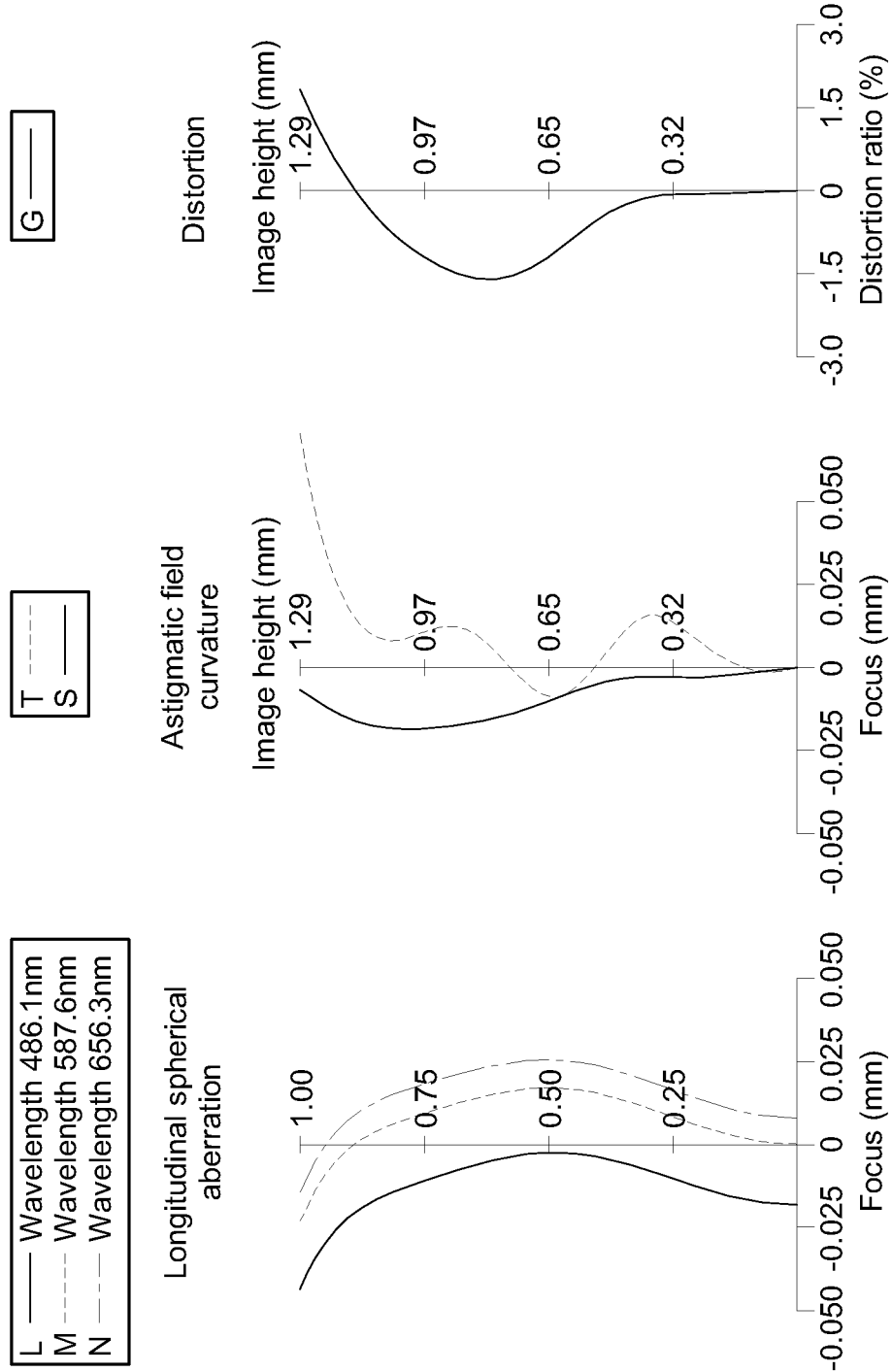

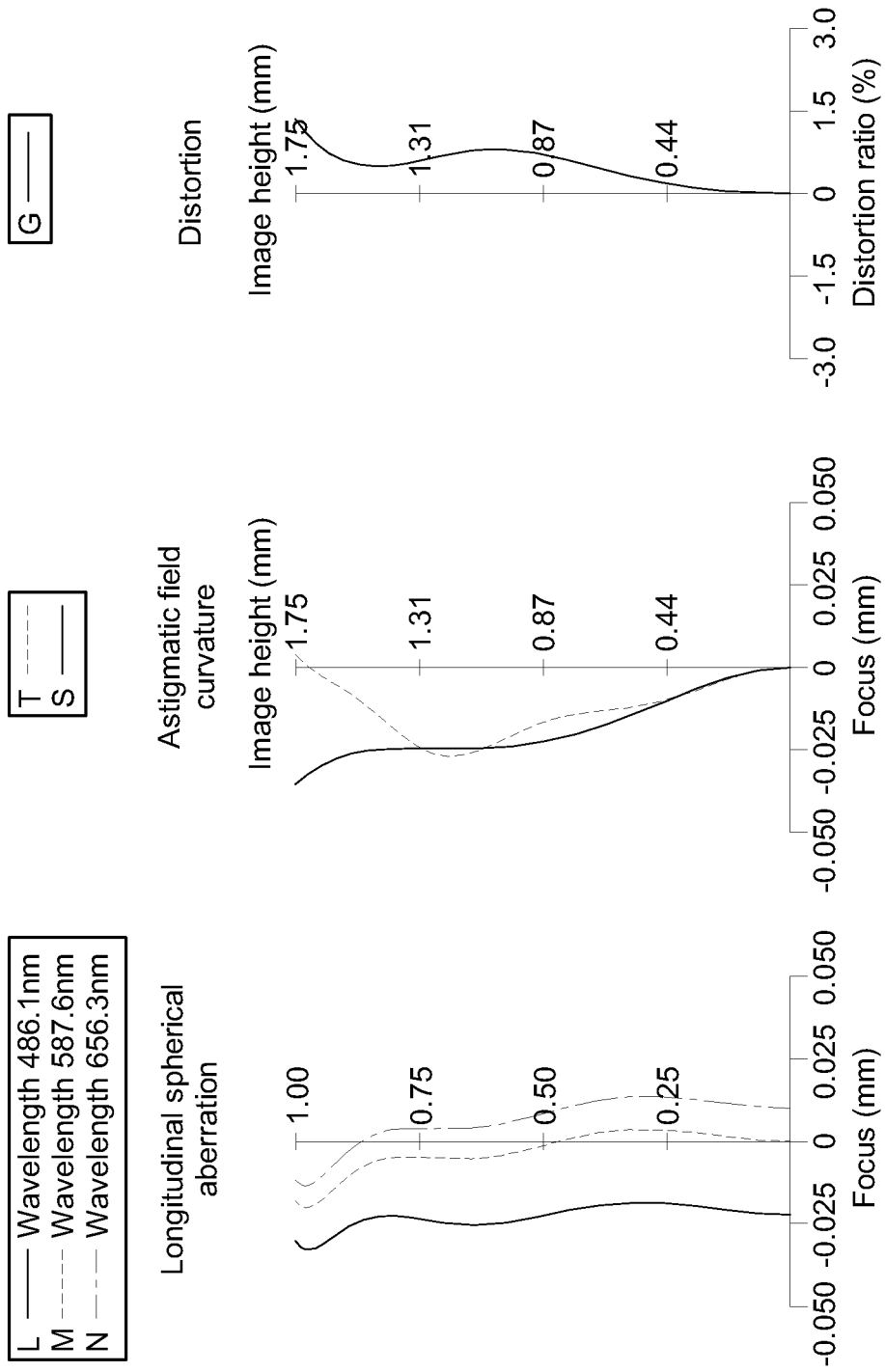

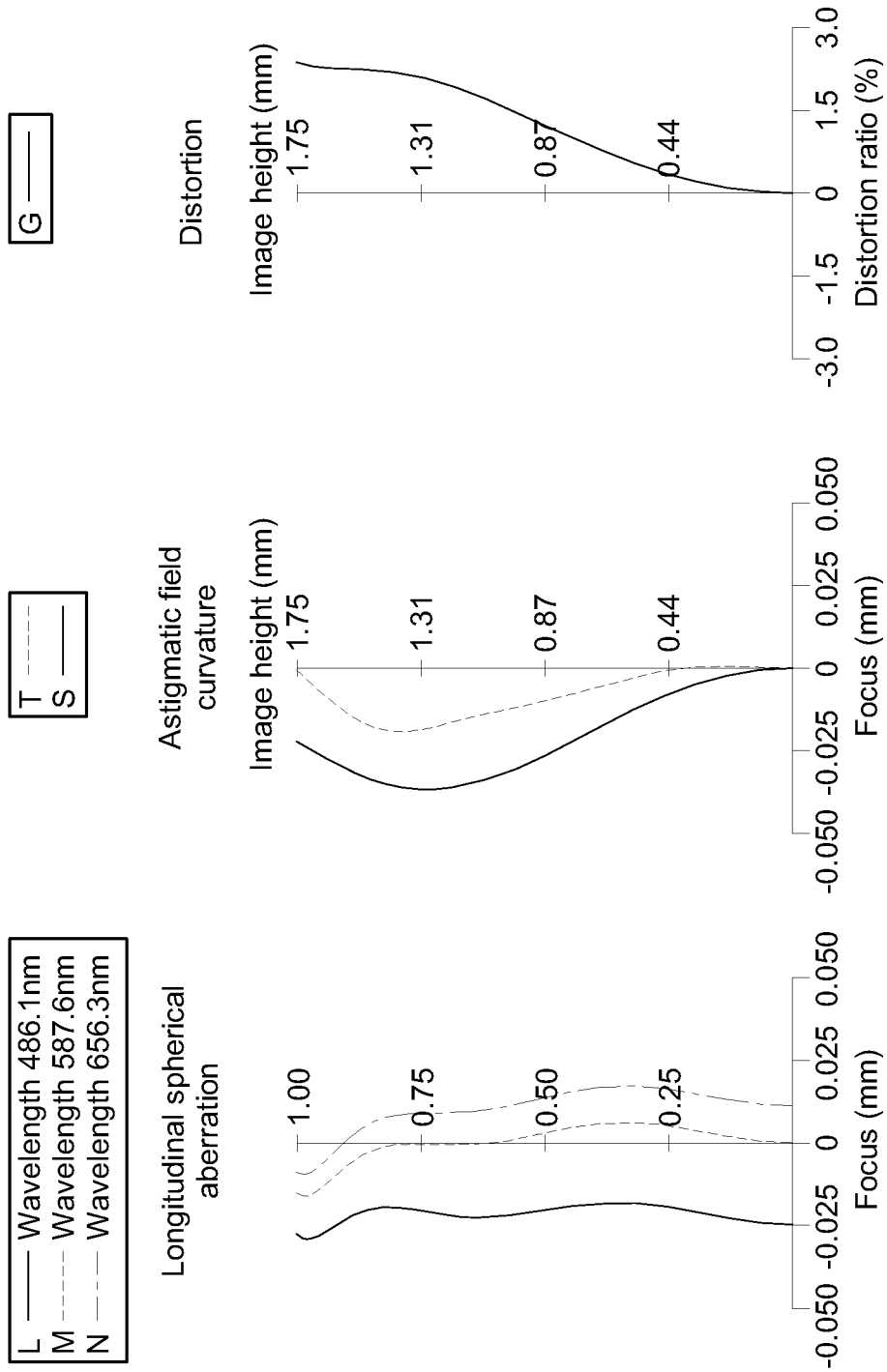

LENS ASSEMBLY OF OPTICAL IMAGING SYSTEM

CROSS-REFERENCE TO RELATED APPLICATIONS

This non-provisional application claims priority under 35 U.S.C. §119(a) on Patent Application No(s). 101129618 filed in Taiwan, R.O.C. on Aug. 15, 2012, the entire contents of which are hereby incorporated by reference.

BACKGROUND OF THE INVENTION

1. Technical Field

The present disclosure relates to a lens assembly of optical imaging system, and more particularly to a lens assembly of optical imaging system applicable to an electronic device.

2. Related Art

In recent years, with the rise of portable electronic devices with photographing capability, the demand for compact photographing lens assemblies has been increasing. The photo-sensing device of an ordinary photographing camera is commonly selected from a charge-coupled device (CCD) and a complementary metal-oxide semiconductor (CMOS) device. With the advance of manufacturing technology, the miniaturization of pixel size of the photo-sensing device is enabled, and the higher pixel density of compact photographing lens assemblies has been realized in the current consumer market. Therefore, obtaining superior imaging quality by the compact photographing lens assemblies is now the main goal for manufacturers to meet the consumer demand.

In order to reduce manufacturing costs, a two-lens structure is commonly adopted in a conventional compact photographing lens assembly of the portable electronic device. For example, U.S. Pat. No. 8,213,097 discloses a compact imaging lens assembly with two lens elements. However, the two lens elements have limited ability to correct the aberration, so the image quality may not satisfy the demand for high-level photographing.

In order to obtain better image quality as well as the miniaturization of the lens assembly, a three-lens optical system is disclosed. For example, U.S. Pat. No. 8,194,172 discloses a three-lens optical imaging lens assembly, including, in order from an object side to an image side, a first lens element with positive refractive power, a second lens element with negative refractive power and a third lens element with negative refractive power. However, only one plastic lens element with lower Abbe number is disposed in the optical imaging lens assembly, so the optical imaging lens assembly may not favorably correct the chromatism. Thus, the optical imaging lens assembly may not satisfy the strict demand for correcting chromatism.

Hence, there is an urgent need for a lens assembly of optical imaging system applicable to a compact and portable electronic device and featuring superior image quality by correcting chromatism.

SUMMARY OF THE INVENTION

According to an embodiment, a lens assembly of optical imaging system comprises, in order from an object side to an image side, a first lens element with positive refractive power having an object-side surface near an optical axis being convex; a second lens element with negative refractive power having an object-side surface wherein the second lens element being concave, which is made of plastic and has both of the object-side surface and an image-side surface of the second lens element being aspheric; and a third lens element having an image-side surface being concave near the optical axis and convex away from the optical axis, which is made of plastic and has both of an object-side surface and the image-side surface of the third lens element being aspheric.

The lens assembly of optical imaging system satisfies the following conditions:

$$0.7 < (V_1 - V_2)/(V_1 - V_3) < 1.5$$

$$30 < V_2 + V_3 < 65$$

$$-0.22 < f/f_2 < 0$$

wherein $V_1$ is an Abbe number of the first lens element, $V_2$ is an Abbe number of the second lens element, $V_3$ is an Abbe number of the third lens element, f is a focal length of the lens assembly of optical imaging system, and $f_2$ is a focal length of the second lens element.

According to another embodiment, a lens assembly of optical imaging system comprises, in order from an object side to an image side, a first lens element with positive refractive power having an object-side surface near an optical axis being convex; a second lens element with negative refractive power having an object-side surface near the optical axis being concave, which is made of plastic and has the object-side surface and an image-side surface being aspheric; and a third lens element having an image-side surface being concave near the optical axis and convex away from the optical axis, which is made of plastic and has an object-side surface and the image-side surface being aspheric.

The lens assembly of optical imaging system satisfies the following conditions:

$$0.7 < (V_1 - V_2)/(V_1 - V_3) < 1.5;$$

$$30 < V_2 + V_3 < 65;$$

$$-0.45 < f/f_2 < 0;$$

$$0.70 < V_3/V_2 < 1.30$$

wherein $V_1$ is an Abbe number of the first lens element, $V_2$ is an Abbe number of the second lens element, $V_3$ is an Abbe number of the third lens element, f is a focal length of the lens assembly of optical imaging system, and $f_2$ is a focal length of the second lens element.

BRIEF DESCRIPTION OF THE DRAWINGS

The present disclosure will become more fully understood from the following detailed description when taken in connection with the accompanying drawings, which show, for purpose of illustrations only, and thus do not limit other possible embodiments derived from the spirit of the present disclosure, and wherein:

Figures 1B, 1C, 1D:
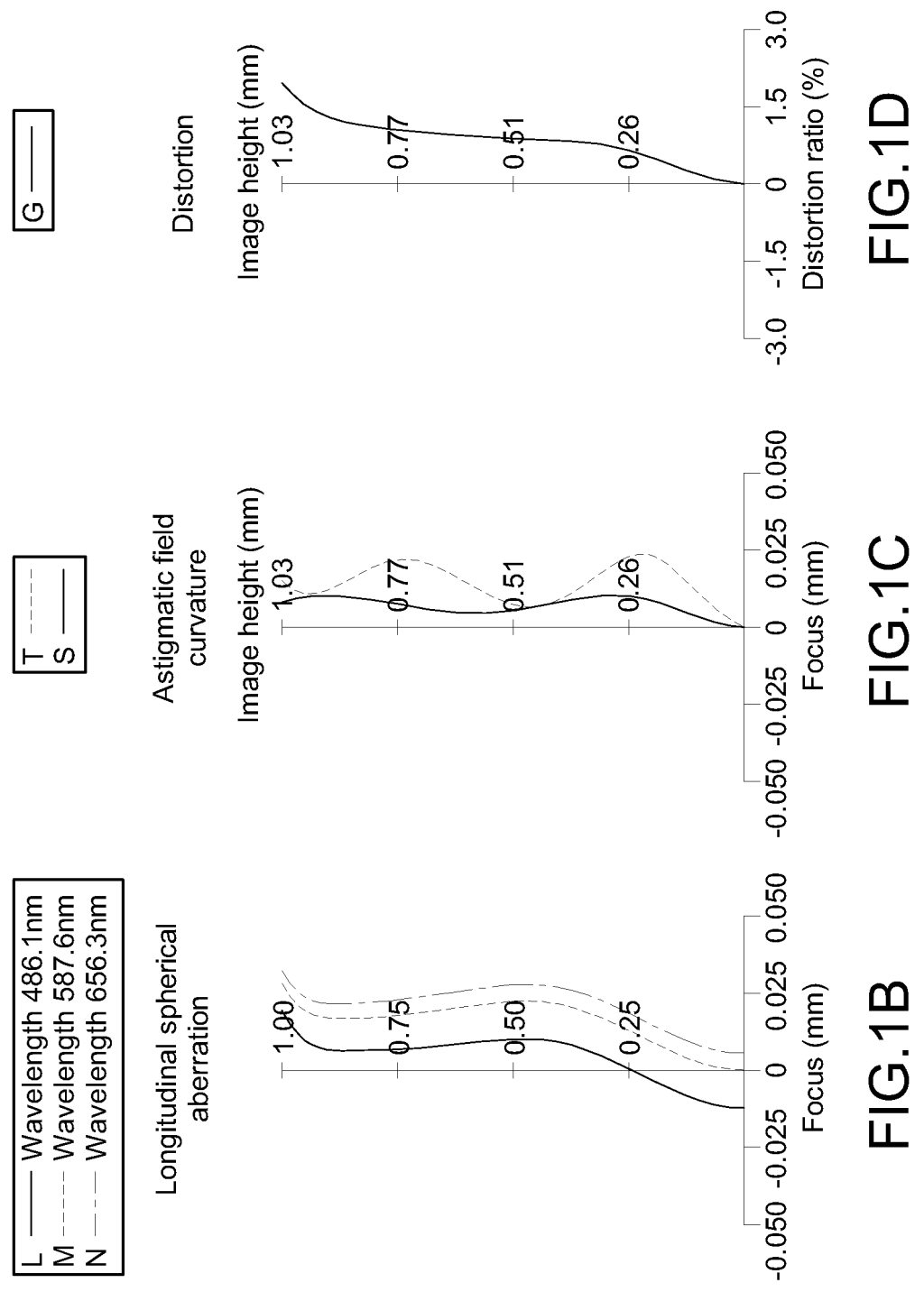

FIG. 1B, FIG. 1C, FIG. 1D are schematic views of longitudinal spherical aberration curves, astigmatic field curves, and a distortion curve, respectively in the lens assembly of optical imaging system in FIG. 1A;

FIG. 4B, FIG. 4C, FIG. 4D are schematic views of longitudinal spherical aberration curves, astigmatic field curves, and a distortion curve, respectively in the lens assembly of optical imaging system in FIG. 4A;

FIG. 5B, FIG. 5C, FIG. 5D are schematic views of longitudinal spherical aberration curves, astigmatic field curves, and a distortion curve, respectively in the lens assembly of optical imaging system in FIG. 5A;

FIG. 7B, FIG. 7C, FIG. 7D are schematic views of longitudinal spherical aberration curves, astigmatic field curves, and a distortion curve, respectively in the lens assembly of optical imaging system in FIG. 7A;

DETAILED DESCRIPTION OF THE INVENTION

Figure 1A:
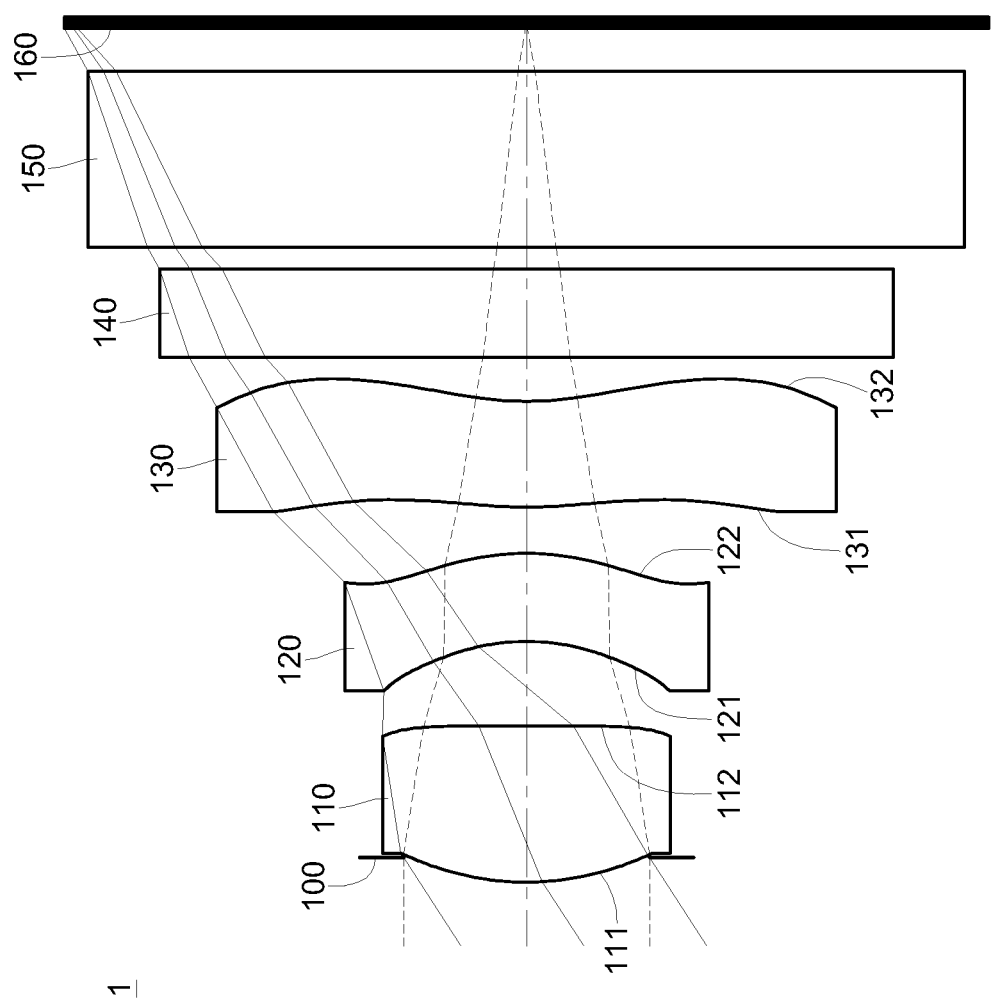
FIG. 1A is a schematic structural view of a first embodiment of a lens assembly of optical imaging system.
Figure 2A:
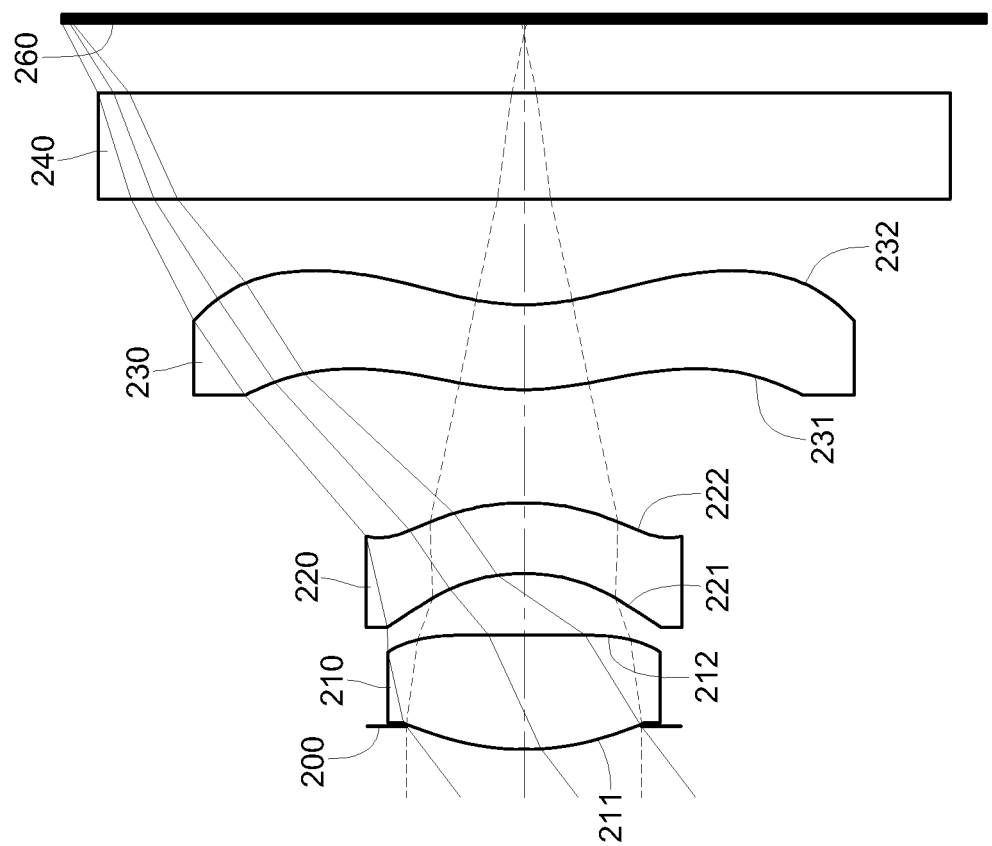
FIG. 2A is a schematic structural view of a second embodiment of a lens assembly of optical imaging system.
Figure 2B:
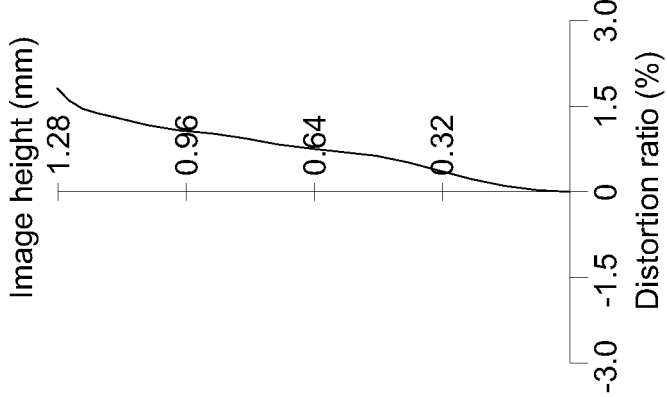
FIG. 2B, FIG. 2C, FIG. 2D are schematic views of longitudinal spherical aberration curves, astigmatic field curves, and a distortion curve, respectively in the lens assembly of optical imaging system in FIG. 2A.
Figure 2C:
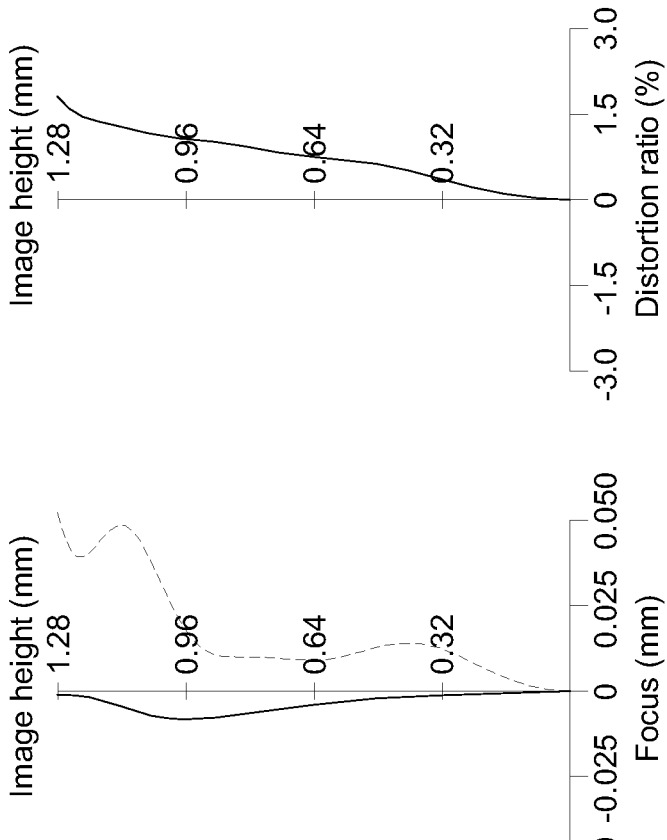
Figure 2D:
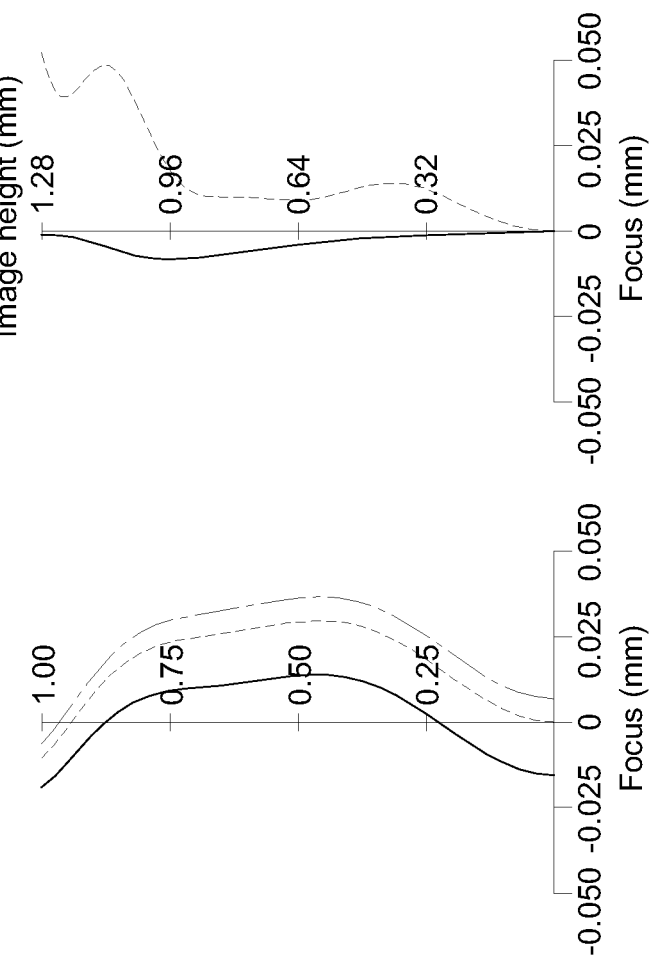
Figure 3A:
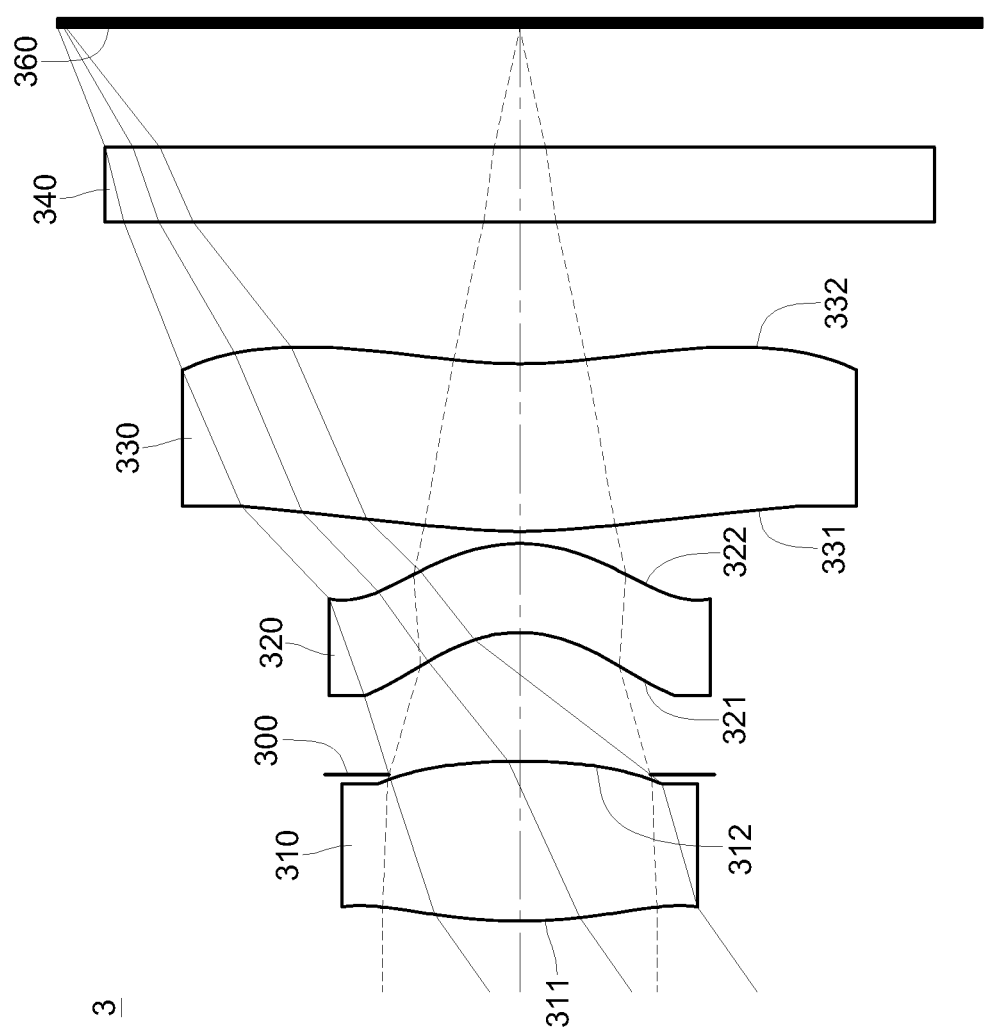
FIG. 3A is a schematic structural view of a third embodiment of a lens assembly of optical imaging system.
Figure 3B:
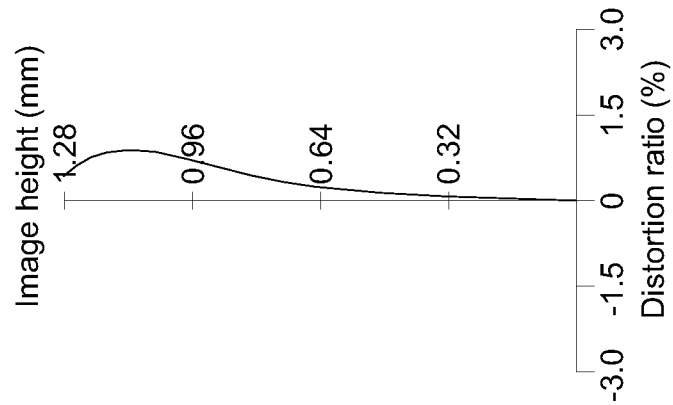
FIG. 3B, FIG. 3C, FIG. 3D are schematic views of longitudinal spherical aberration curves, astigmatic field curves, and a distortion curve, respectively in the lens assembly of optical imaging system in FIG. 3A.
Figure 3C:
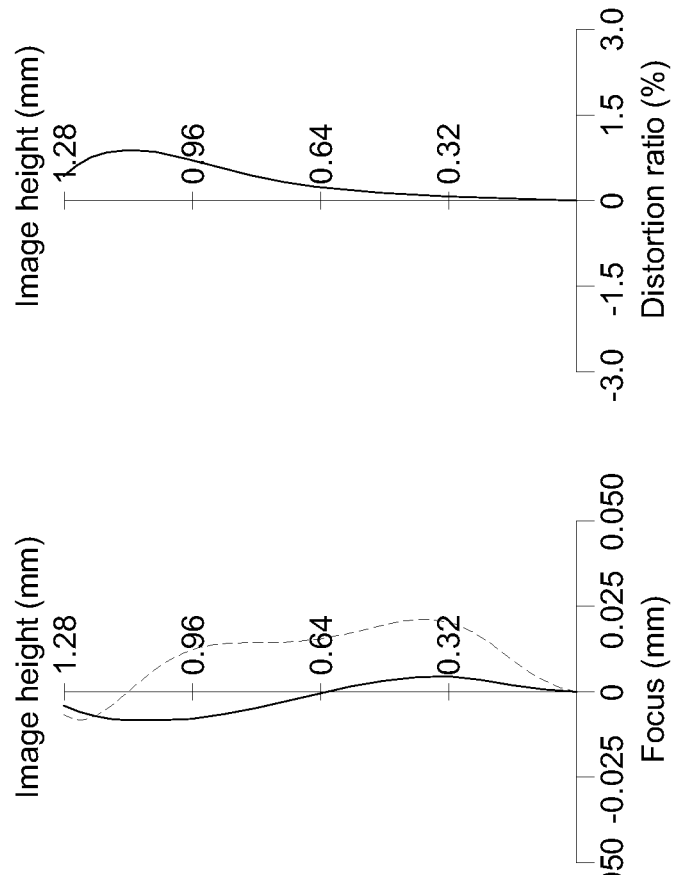
Figure 3D:
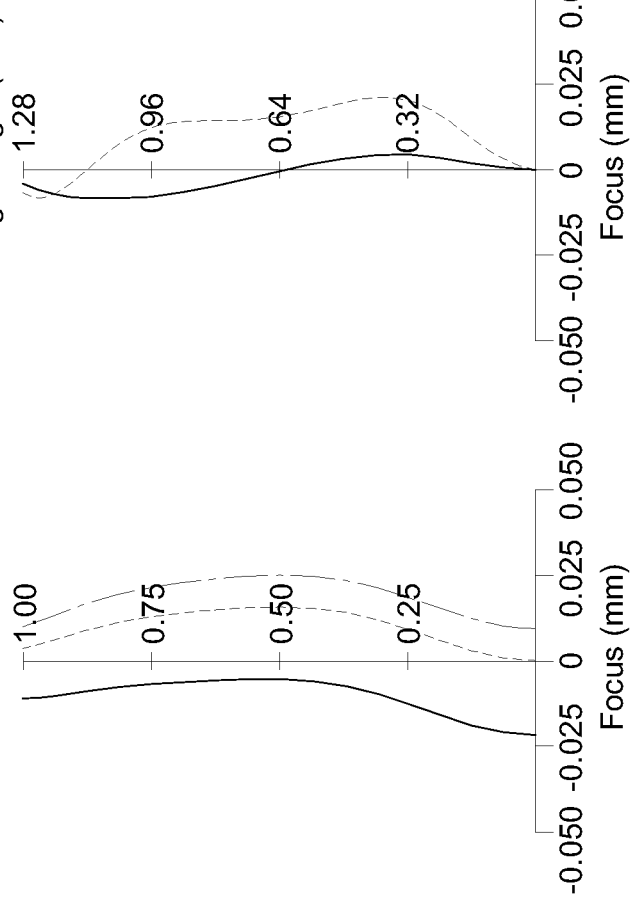
Figure 4A:
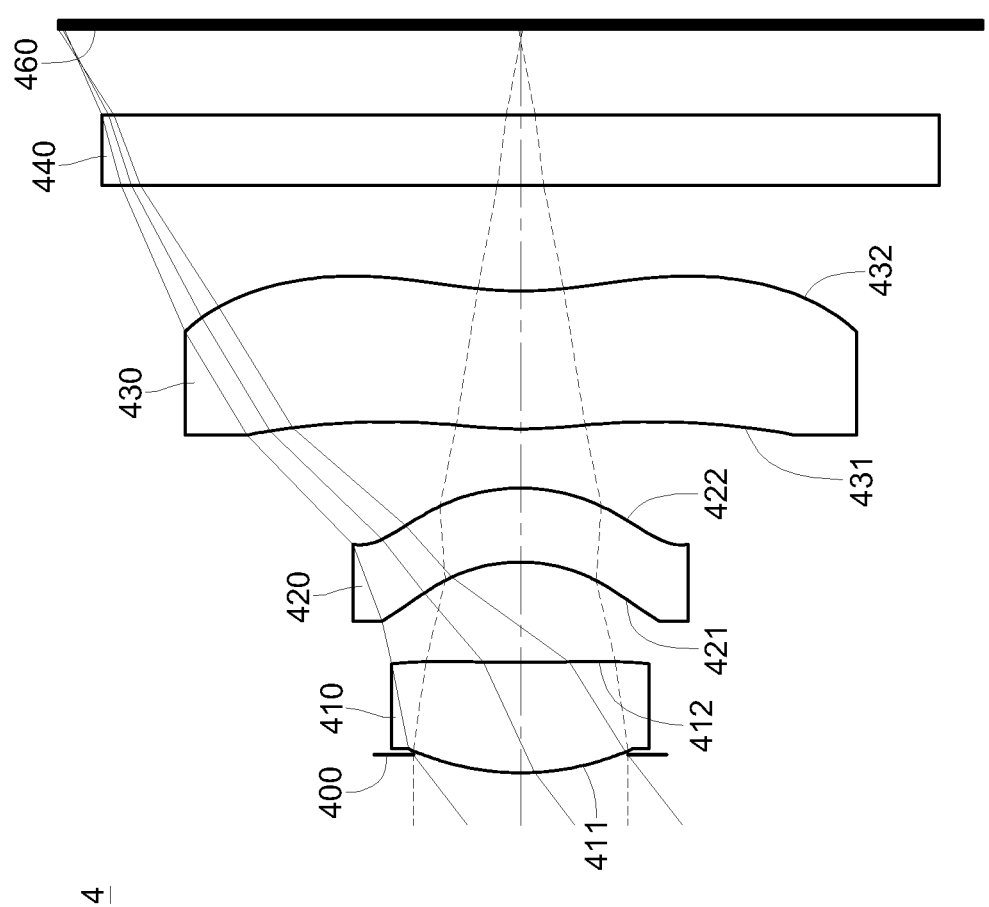
FIG. 4A is a schematic structural view of a fourth embodiment of a lens assembly of optical imaging system.
Figure 5A:
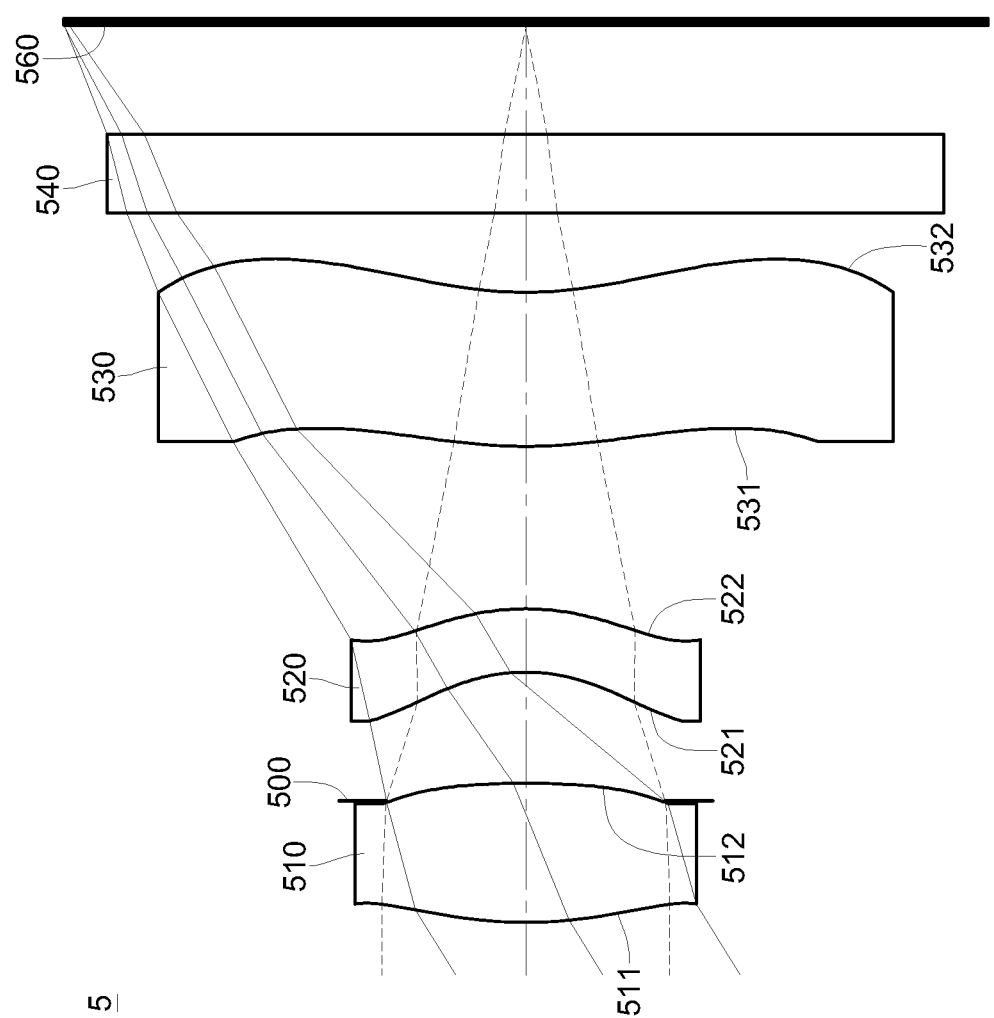
FIG. 5A is a schematic structural view of a fifth embodiment of a lens assembly of optical imaging system.
Figure 6A:
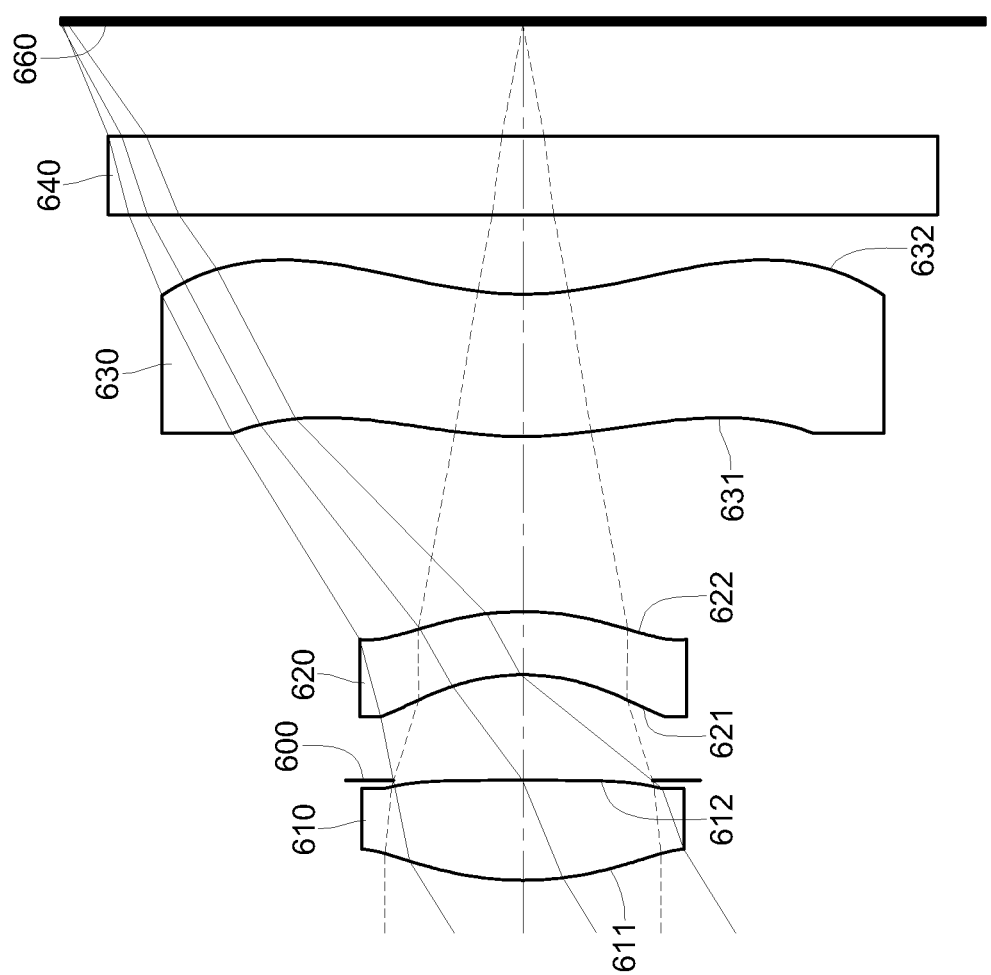
FIG. 6A is a schematic structural view of a sixth embodiment of a lens assembly of optical imaging system.
Figures 6B, 6C, 6D:
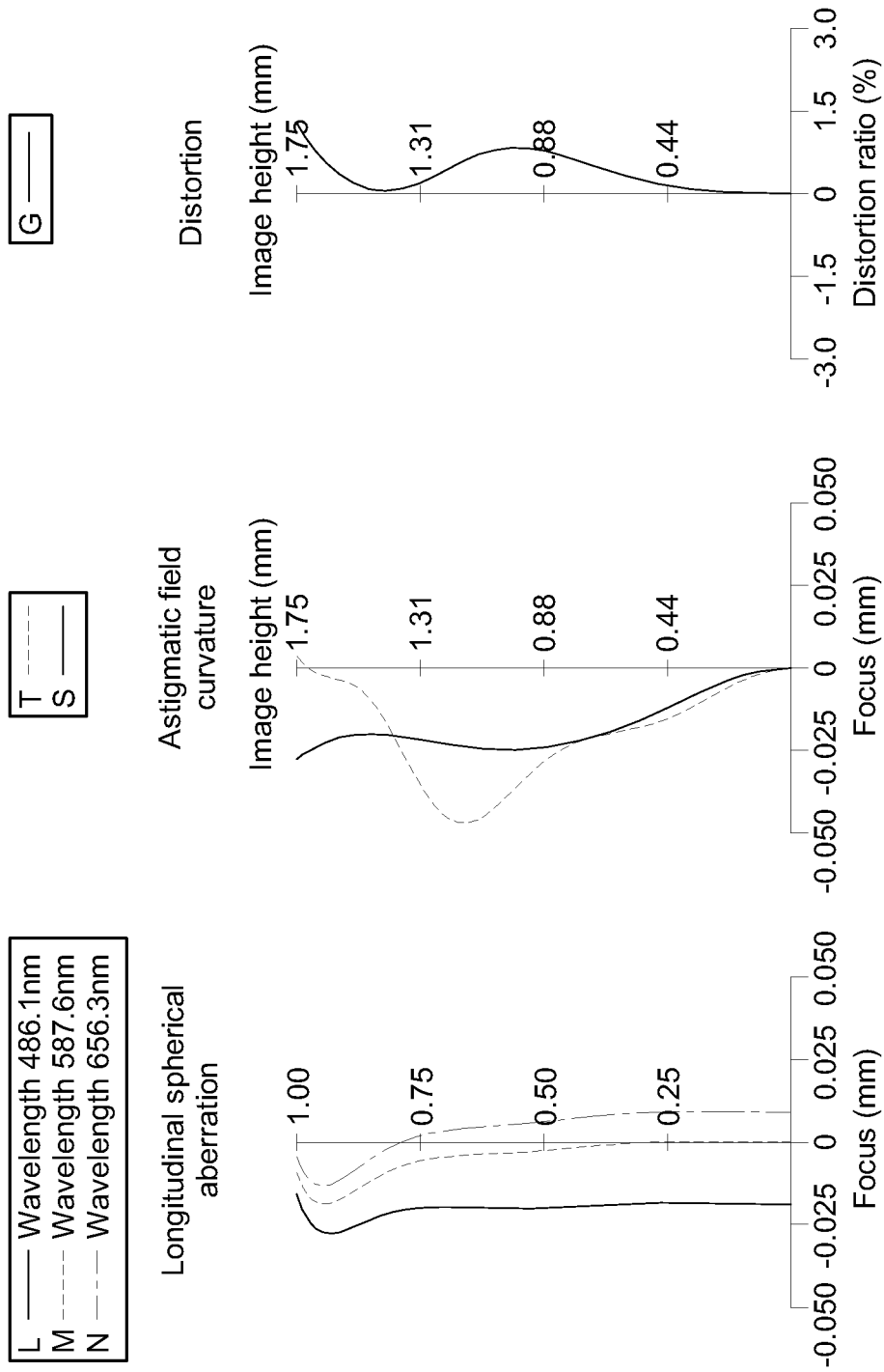
FIG. 6B, FIG. 6C, FIG. 6D are schematic views of longitudinal spherical aberration curves, astigmatic field curves, and a distortion curve, respectively in the lens assembly of optical imaging system in FIG. 6A.
Figure 7A:
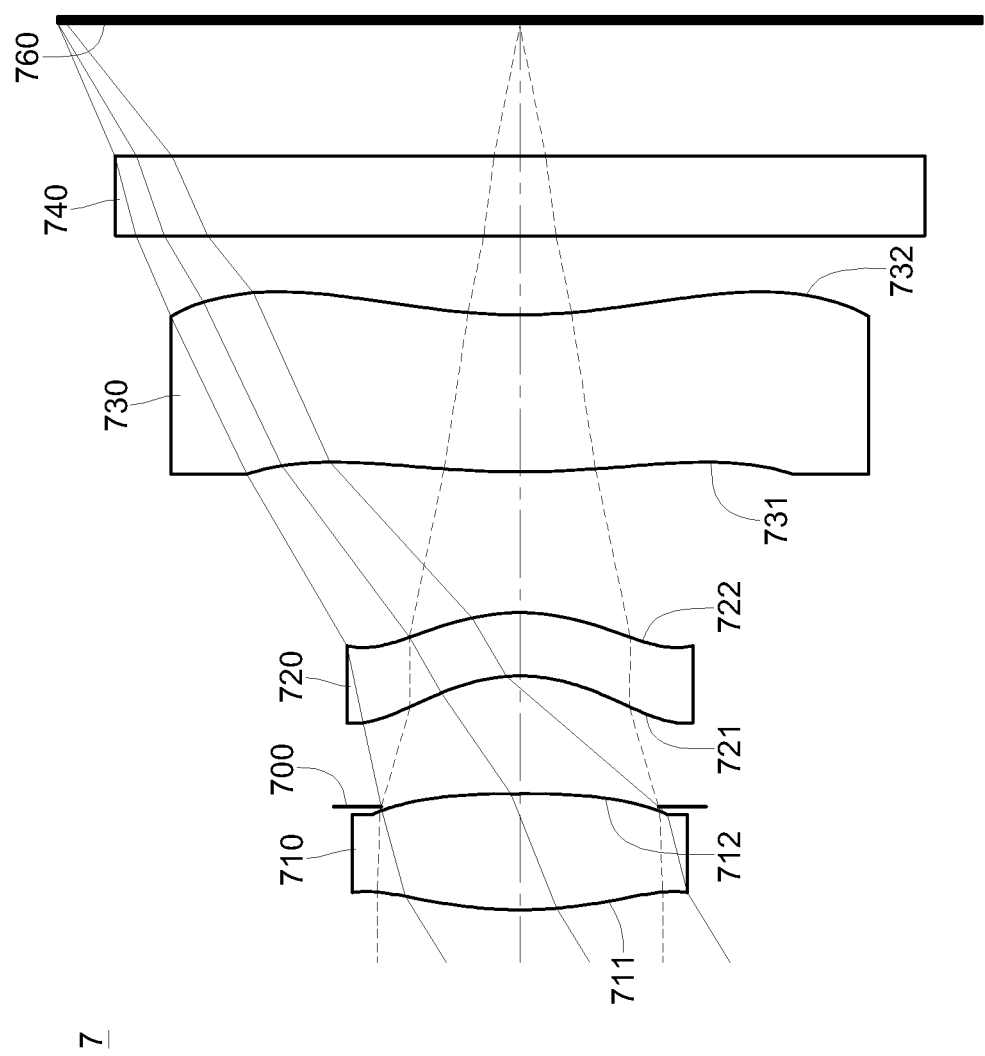
FIG. 7A is a schematic structural view of a seventh embodiment of a lens assembly of optical imaging system.
Figure 8A:
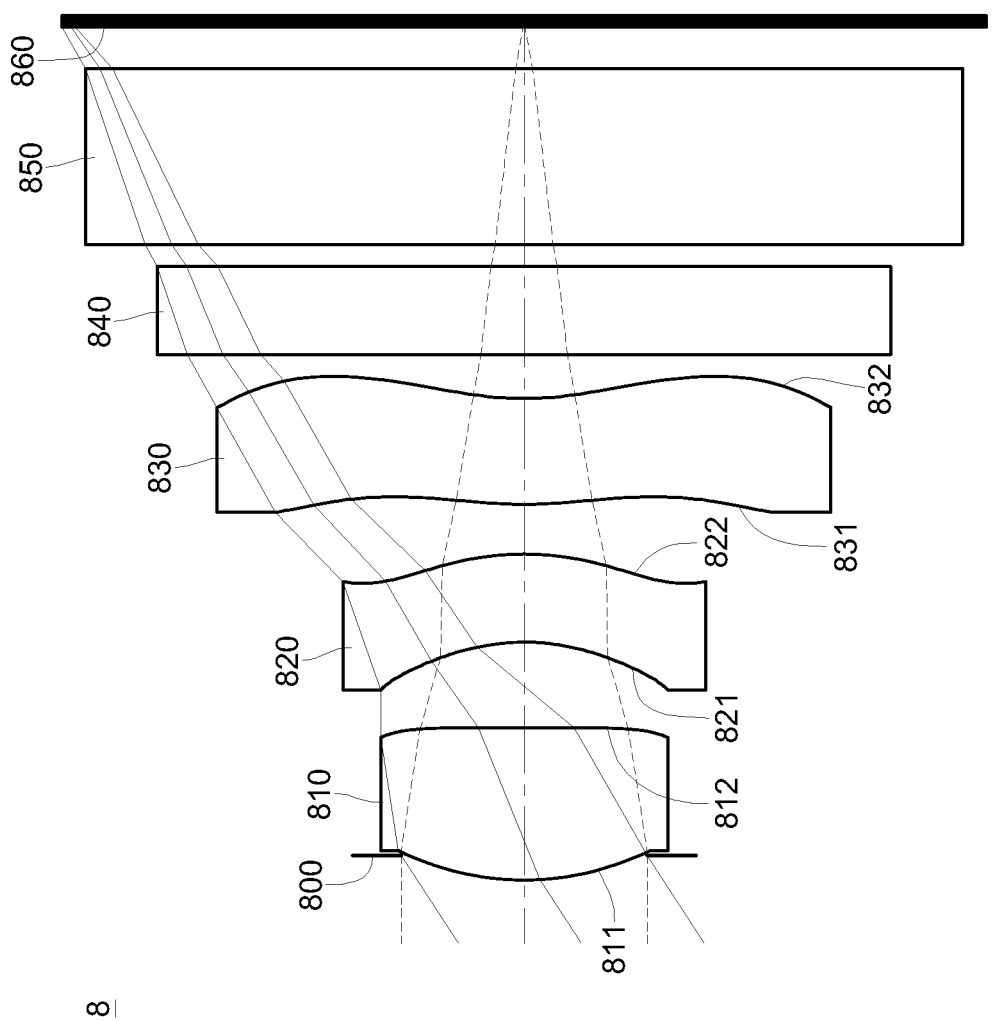
FIG. 8A is a schematic structural view of an eighth embodiment of a lens assembly of optical imaging system.
Figure 8B:
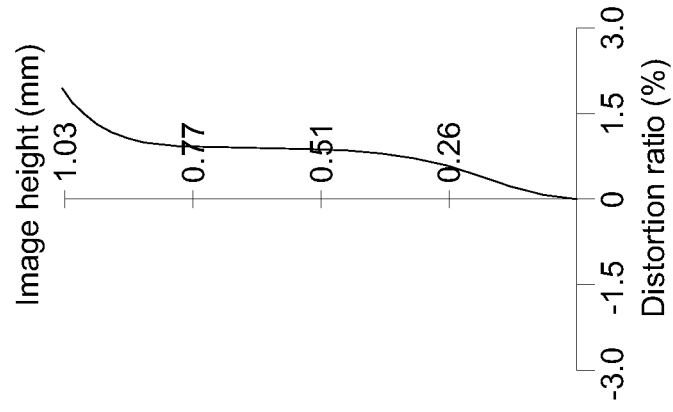
FIG. 8B, FIG. 8C, FIG. 8D are schematic views of longitudinal spherical aberration curves, astigmatic field curves, and a distortion curve, respectively in the lens assembly of optical imaging system in FIG. 8A.
Figure 8C:
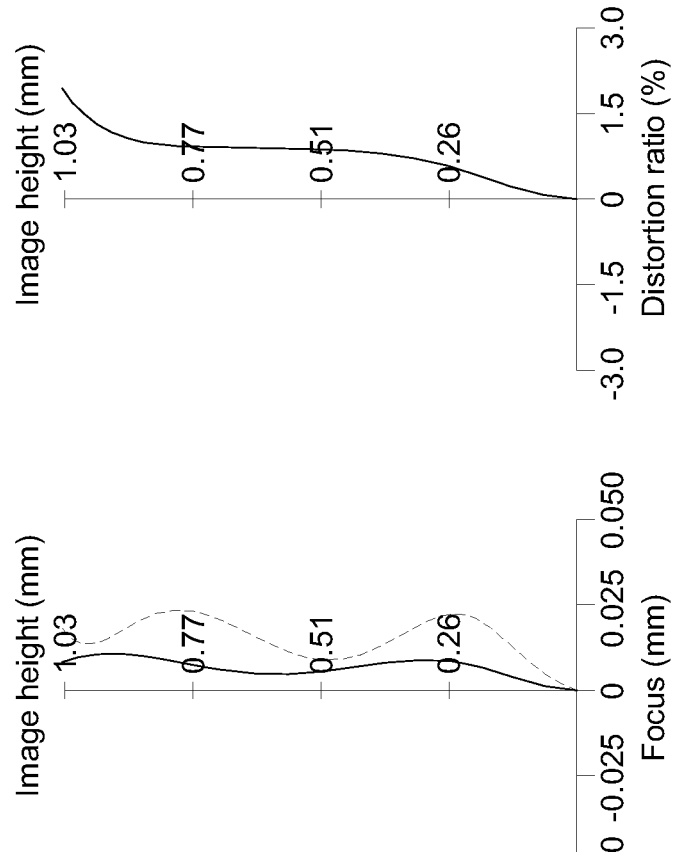
Figure 8D:
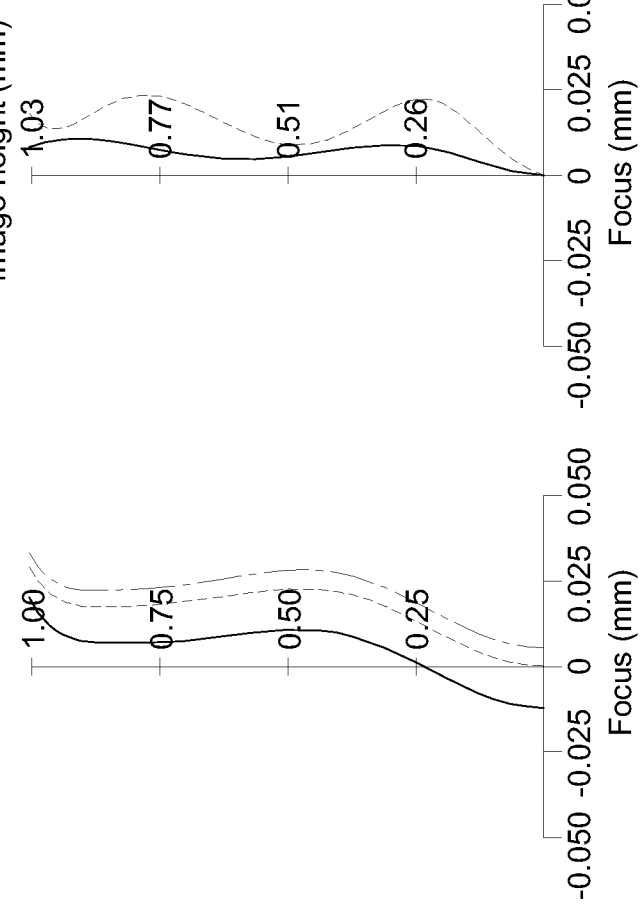

The optical lens assembly for image taking of the present disclosure is described to illustrate that the embodiments have similar lens combinations, configuration relationships, and the same conditions of the optical lens assembly. The differences are described in detail in the following embodiments.

The lens assembly of optical imaging system comprises, from an object side to an image side along an optical axis in sequence, a first lens element with refractive power, a second lens element with refractive power, and a third lens element with refractive power.

The object-side surface of the first lens element with positive power is convex near the optical axis so that a portion of the positive refractive power of the lens assembly of optical imaging system is provided and the total track length of the lens assembly of optical imaging system is shortened.

The object-side surface of the second lens element is concave, the second lens element is made of plastic, and both of the object-side surface and the image-side surface of the second lens element are aspheric. The second lens element has negative refractive power so that the aberration resulted from the first lens element with positive refractive power may be effectively corrected.

The image-side surface of the third lens element with negative refractive power is concave near the optical axis and concave away from the optical axis, the third lens element is made of plastic, and both of the object-side surface and the image-side surface of the third lens element are aspheric so that the principal point of the lens assembly of optical imaging system is farther away from an image plane to reduce a rear focal length of the lens assembly of optical imaging system. Therefore, the total track length of the lens assembly of optical imaging system is shortened for achieving the miniaturization of the lens assembly of optical imaging system.

$V_1$ is an Abbe number of the first lens element; $V_2$ is an Abbe number of the second lens element; and $V_3$ is an Abbe number of the third lens element. When the lens assembly of optical imaging system satisfies $0.7<(V_1-V_2)/(V_1-V_3)<1.5$, because of the arrangement that the Abbe number of the first lens element is much different than those of the second lens element and the third lens element, the chromatism of the lens assembly of optical imaging system may be corrected effectively. In some embodiments, the lens assembly of optical imaging system further satisfies $0.7<(V_1-V_2)/(V_1-V_3)<1.25$.

$V_2$ is the Abbe number of the second lens element; and $V_3$ is the Abbe number of the third lens element. When the lens assembly of optical imaging system satisfies $30<V_2+V_3<65$, the ability of correcting the chromatism of the lens assembly of optical imaging system can be enhanced. In some embodiments, the lens assembly of optical imaging system further satisfies $35<V_2+V_3<55$. In other embodiments, the lens assembly of optical imaging system further satisfies $40<V_2+V_3<49$.

f is a focal length of the lens assembly of optical imaging system; and $f_2$ is a focal length of the second lens element. When the lens assembly of optical imaging system satisfies $-0.45<f/f_2<0$, the second lens element is more proper for correcting the aberration resulted from the first lens element and reducing the sensitivity of the lens assembly of optical imaging system. In some embodiments, the lens assembly of optical imaging system further satisfies $-0.22<f/f_2<0$.

$V_2$ is the Abbe number of the second lens element; and $V_3$ is the Abbe number of the third lens element. When the lens assembly of optical imaging system satisfies $0.70<V_3/V_2<1.30$, the arrangement of the Abbe number of the second lens element and the third lens element is more proper for correcting the chromatism.

$R_1$ is a curvature radius of the object-side surface of the first lens element, and $R_2$ is a curvature radius of the image-side surface of the first lens element. When the lens assembly of optical imaging system satisfies $-1.0<R_1/R_2<0.20$, it is favorable for correcting the spherical aberration. In some embodiments, the lens assembly of optical imaging system further satisfies $-0.8<R_1/R_2<0.2$. In other embodiments, the lens assembly of optical imaging system further satisfies $0<R_1/R_2<0.10$.

The second lens element has an inclination toward the image side at the end part of a peripheral region within the effective radius of the image-side surface of the second lens element. Therefore, the angle at which the incident light projects onto an image sensor of the image plane from off-axis field can be effectively reduced for improving the receiving efficiency of the image sensor is improved and correcting the off-axis aberration.

$f_2$ is the focal length of the second lens element; $f_3$ is a focal length of the third lens element. When the lens assembly of optical imaging system satisfies $0.08<f_2/f_3<2.0$, the arrangement of the refractive powers of the second lens element and the third lens element is more balanced, thereby correcting the aberration and the reducing the sensitivity.

SL is an axial distance between a stop and the image plane, and TTL is an axial distance between the object-side surface of the first lens element and the image plane. When the lens assembly of optical imaging system satisfies $0.93<SL/TTL<1.05$, a good balance between the telecentric characteristic and the wide-angle-of-view characteristic of the lens assembly of optical imaging system is obtained.

$T_{12}$ is an axial distance between the first lens element and the second lens element, and $T_{23}$ is an axial distance between the second lens element and the third lens element. When the lens assembly of optical imaging system satisfies $0.5<T_{12}/T_{23}<2.0$, the distances between each of the lens elements are proper for the assembly of the lens elements as well as the miniaturization of the lens assembly of optical imaging system.

$N_1$ is an index of refraction of the first lens element, $N_2$ is an index of refraction of the second lens element, and $N_3$ is an index of refraction of the third lens element. When the lens assembly of optical imaging system satisfies $N_1<N_2$, $N_1<N_3$, $1.60<N_2$ and $1.60<N_3$, the choices of the optical plastic materials of the first lens element, the second lens element and the third lens element are cost-effective and proper for correcting the chromatism.

In addition, in the lens assembly of optical imaging system, a convex surface means the surface at a paraxial region is convex; a concave surface means the surface at a paraxial region is concave.

In the lens assembly of optical imaging system according to the disclosure, the lens elements may be made of plastic or glass. When the material of the lens element is plastic, the manufacturing cost may be effectively reduced. When the material of the lens element is glass, it may allow more freedom in the refractive power arrangement of the optical lens assembly for image taking. Moreover, the surface shapes of the lens elements are easily made into aspherical profiles, allowing more design parameter freedom which can be used to reduce the aberrations and total number of the lens elements so that the total optical length of the optical lens assembly for image taking may be shortened effectively.

At least one stop such as a glare stop may be disposed in the optical lens assembly for image taking for reducing stray light, thereby enhancing image quality.

In the lens assembly of optical imaging system according to the disclosure, an aperture stop may be arranged as a front stop or a middle stop. The front stop is disposed between the object and the first lens element. The middle stop is disposed between the first lens element and the image plane. When the stop is the front stop, the distance between the exit pupil of the lens assembly of optical imaging system and the image plane is increased, the telecentric effect is then obtained and the photo-sensing efficiency of a CCD or CMOS sensor is also improved. When the stop is the middle stop, the angle of view of the lens assembly of optical imaging system is widened. Thus, the lens assembly of optical imaging system has traits and advantages of a wide-angle lens.

As for the lens assembly of optical imaging system, the specific schemes are further described with the following embodiments. Parameters in the embodiments are defined as followed. The aspheric surface in the embodiments may be represented by, but not limited to, the following aspheric surface equation (Formula ASP):

$$X(Y) = (Y^2/R)/(1 + sqrt(1 - (1+k)*(Y/R)^2)) + \sum_i (Ai)*(Y^i)$$

wherein X is the distance of a point on the aspheric surface at a distance Y away from the optical axis relative to the tangential plane at the aspheric surface vertex on the optical axis, Y is the distance from the point on the curve of the aspheric surface to the optical axis, k is a conic factor, Ai is an $i^{th}$ order aspheric surface coefficient, and in the embodiments, R is the curvature radius, and in the embodiments, it may be, but is not limited to, 1 through 16.

The First Embodiment

Embodiment 1

Referring to FIGS. 1A to 1D, the lens assembly of optical imaging system 1 of the first embodiment comprises, from an object side to an image side along an optical axis (from left to right in FIG. 1A) in sequence, a stop, a first lens element 110, a second lens element 120, a third lens element 130, an IR-cut filter (infrared-cut filter) 140, a cover glass 150 and an image plane 160. The stop may be an aperture stop 100.

The first lens element 110 with positive refractive power has an aspheric convex object-side surface 111 near the optical axis and an aspheric image-side surface 112. The image-side surface 112 is concave near the optical axis and convex away from the optical axis. The first lens element 110 is made of plastic. The second lens element 120 with negative refractive power has an aspheric concave object-side surface 121 near the optical axis and an aspheric convex image-side surface 122 near the optical axis. The second lens element 120 is made of plastic. The second lens element 120 has an inclination toward the image side at the end part of a peripheral region within the effective radius of the image-side surface 122 of the second lens element 120. The third lens element 130 with negative refractive power has an aspheric convex object-side surface 131 and an aspheric image-side surface 132. The image-side surface 132 is concave near the optical axis and convex away from the optical axis. The third lens element 130 is made of plastic.

In this embodiment, the reference wavelength of the incident light ray on the lens assembly of optical imaging system 1 is 587.6 nm. However, the reference wavelength of the light does not intend to limit the disclosure. In some embodiments, light with different wavelength can be utilized for demonstrations of different purposes.

The detailed data of the lens assembly of optical imaging system 1 is as shown in Table 1-1 below:

TABLE 1-1

Embodiment 1
f = 1.53 mm, Fno = 2.75, HFOV = 33.0 deg.

| Surface # | | Curvature radius (mm) | | Thickness (mm) | Material | Index | Abbe # | Focal length (mm) |
|---|---|---|---|---|---|---|---|---|
| 0 | Object | — | Plano | Infinity | — | — | — | — |
| 1 | Ape. Stop | — | Plano | −0.056 | — | — | — | — |
| 2 | Lens 1 | 0.626 | ASP | 0.355 | Plastic | 1.544 | 55.9 | 1.16 |
| 3 | | 100.000 | ASP | 0.192 | | | | |
| 4 | Lens 2 | −0.481 | ASP | 0.200 | Plastic | 1.640 | 23.3 | −9.12 |
| 5 | | −0.609 | ASP | 0.105 | | | | |
| 6 | Lens 3 | 1.024 | ASP | 0.240 | Plastic | 1.640 | 23.3 | −4.45 |
| 7 | | 0.684 | ASP | 0.100 | | | | |
| 8 | IR-cut | — | Plano | 0.200 | Glass | 1.517 | 64.2 | — |
| 9 | filter | — | Plano | 0.050 | | | | |
| 10 | Cover Glass | — | Plano | 0.400 | Glass | 1.517 | 64.2 | — |

TABLE 1-1-continued

Embodiment 1
f = 1.53 mm, Fno = 2.75, HFOV = 33.0 deg.

| Surface # | | Curvature radius (mm) | Thickness (mm) | Material | Index | Abbe # | Focal length (mm) |
|---|---|---|---|---|---|---|---|
| 11 | | — | Plano | 0.098 | | | |
| 12 | Image Plane | — | Plano | — | — | — | — |

Note:
Reference wavelength is d-line 587.6 nm, and ASP represents aspheric.

In Table 1-1, from the object-side surface 111 to the image-side surface 132, all the surfaces can be aspheric, and the aspheric surfaces can satisfy Formula ASP, but are not limited thereto. As for the parameters of the aspheric surfaces, reference is made to Table 1-2 below:

TABLE 1-2

Aspheric Coefficients

| | Surface# | | |
|---|---|---|---|
| | 2 | 3 | 4 |
| k = | −1.1496E+00 | 1.0000E+01 | −4.5600E−01 |
| A4 = | 8.2188E−02 | −3.1808E−01 | 1.1417E+00 |
| A6 = | 1.5850E+01 | −3.4297E+01 | 4.3940E−01 |
| A8 = | −3.9847E+02 | 6.6071E+02 | 5.2316E+01 |
| A10 = | 4.5139E+03 | −7.3075E+03 | 6.5478E+02 |
| A12 = | −2.1234E+04 | 2.4192E+04 | −1.7553E+04 |

| | Surface# | | |
|---|---|---|---|
| | 5 | 6 | 7 |
| k = | 5.6125E−01 | −3.9946E+01 | −1.0259E+01 |
| A4 = | 4.5595E−01 | −1.8041E+00 | −1.4234E+00 |
| A6 = | 2.7917E+01 | 4.8460E+00 | 3.3020E+00 |
| A8 = | −6.5980E+01 | −7.4928E+00 | −6.9441E+00 |
| A10 = | 5.7755E+02 | 8.2338E+00 | 7.0177E+00 |
| A12 = | −3.9484E+03 | 2.8737E−01 | 1.7126E+00 |
| A14 = | 8.4929E+03 | 2.8127E+00 | −1.3240E+01 |
| A16 = | — | −1.6603E+01 | 1.2016E+01 |

In Table 1-1, the curvature radius, the thickness and the focal length are shown in millimeters (mm). Surface numbers 0-16 represent the surfaces sequentially arranged from the object-side to the image-side along the optical axis. "f" stands for the focal length, "Fno" is the f-number, and "HFOV" is a half of maximal field of view of this embodiment. In Table 1-2, k represents the conic coefficient of the equation of the aspheric surface profiles. A1-A16 represent the aspheric coefficients ranging from the $1^{st}$ order to the $16^{th}$ order. All labels for Tables of the remaining embodiments share the same definitions as those in Table 1-1 and Table 1-2 of the first embodiment, and their definitions will not be stated again.

The content of Table 1-3 may be deduced from Table 1-1:

TABLE 1-3

| Embodiment 1 | | | |
|---|---|---|---|
| f (mm) | 1.53 | $V_2 + V_3$ | 46.6 |
| Fno | 2.75 | $V_3/V_2$ | 1.00 |
| HFOV(deg.) | 33.0 | $f/f_2$ | −0.17 |
| $N_1$ | 1.544 | $R_1/R_2$ | 0.01 |
| $N_2$ | 1.640 | $f_2/f_3$ | 2.05 |
| $N_3$ | 1.640 | $T_{12}/T_{23}$ | 1.83 |
| $(V_1 - V_2)/(V_1 - V_3)$ | 1.00 | SL/TTL | 0.97 |

The Second Embodiment

Embodiment 2

Referring to FIGS. 2A to 2D, the lens assembly of optical imaging system 2 of the second embodiment comprises, from an object side to an image side along an optical axis in sequence, a stop, a first lens element 210, a second lens element 220, a third lens element 230, an IR-cut filter 240 and an image plane 260. The stop may be an aperture stop 200.

The first lens element 210 with positive refractive power has an aspheric convex object-side surface 211 near the optical axis and an aspheric image-side surface 212. The image-side surface 212 is concave near the optical axis and convex away from the optical axis. The first lens element 210 is made of plastic. The second lens element 220 with negative refractive power has an aspheric concave object-side surface 221 near the optical axis and an aspheric convex image-side surface 222 near the optical axis. The second lens element 220 is made of plastic. The second lens element 220 has an inclination toward the image side at the end part of a peripheral region within the effective radius of the image-side surface 222 of the second lens element 220. The third lens element 230 with negative refractive power has an aspheric convex object-side surface 231 and an aspheric image-side surface 232. The image-side surface 232 is concave near the optical axis and convex away from the optical axis. The third lens element 230 is made of plastic.

The detailed data of the lens assembly of optical imaging system 2 is as shown in Table 2-1 below:

TABLE 2-1

Embodiment 2
f = 1.63 mm, Fno = 2.45, HFOV = 37.5 deg.

| Surface # | | Curvature radius (mm) | Thickness (mm) | Material | Index | Abbe # | Focal length (mm) |
|---|---|---|---|---|---|---|---|
| 0 | Object | — | Plano | Infinity | — | — | — |
| 1 | Ape. Stop | — | Plano | −0.065 | — | — | — |

TABLE 2-1-continued

Embodiment 2
f = 1.63 mm, Fno = 2.45, HFOV = 37.5 deg.

| Surface # | | Curvature radius (mm) | | Thickness (mm) | Material | Index | Abbe # | Focal length (mm) |
|---|---|---|---|---|---|---|---|---|
| 2 | Lens 1 | 0.746 | ASP | 0.325 | Plastic | 1.544 | 55.9 | 1.40 |
| 3 | | 28.019 | ASP | 0.173 | | | | |
| 4 | Lens 2 | −0.548 | ASP | 0.200 | Plastic | 1.640 | 23.3 | −8.43 |
| 5 | | −0.696 | ASP | 0.320 | | | | |
| 6 | Lens 3 | 0.744 | ASP | 0.240 | Plastic | 1.607 | 26.6 | −52.83 |
| 7 | | 0.638 | ASP | 0.300 | | | | |
| 8 | IR-cut filter | — | Plano | 0.300 | Glass | 1.517 | 64.2 | — |
| 9 | | — | Plano | 0.196 | | | | |
| 10 | Image Plane | — | Plano | — | — | — | — | — |

Note:
Reference wavelength is d-line 587.6 nm, and ASP represents aspheric.

As for the parameters of the aspheric surfaces, reference is made to Table 2-2 below.

TABLE 2-2

Aspheric Coefficients

| | Surface# | | |
|---|---|---|---|
| | 2 | 3 | 4 |
| k = | −1.7109E+00 | −2.0000E+01 | −2.4871E−01 |
| A4 = | −1.5123E−01 | −9.9710E−01 | −1.8087E+00 |
| A6 = | 1.6465E+01 | −1.2751E+01 | −3.6026E+00 |
| A8 = | −2.8579E+02 | 5.5814E+01 | 2.0873E+02 |
| A10 = | 2.0685E+03 | −3.6282E+02 | −8.3042E+02 |
| A12 = | −6.3205E+03 | 9.7594E+02 | 9.9082E+02 |

| | Surface# | | |
|---|---|---|---|
| | 5 | 6 | 7 |
| k = | −8.3058E−01 | −2.6753E+00 | −9.1850E−01 |
| A4 = | −1.4538E+00 | −2.3130E+00 | −2.7398E+00 |
| A6 = | 1.2063E+01 | 5.3571E+00 | 6.1620E+00 |
| A8 = | −5.6318E+01 | −7.3859E+00 | −1.0384E+01 |
| A10 = | 8.2373E+02 | 5.5313E+00 | 1.0174E+01 |
| A12 = | −3.2438E+03 | −5.7514E+00 | −4.0566E+00 |
| A14 = | 3.8083E+03 | 8.0096E+00 | −1.5214E+00 |
| A16 = | — | −3.7685E+00 | 1.4316E+00 |

The content of Table 2-3 may be deduced from Table 2-1.

TABLE 2-3

Embodiment 2

| f (mm) | 1.63 | $V_2 + V_3$ | 46.9 |
|---|---|---|---|
| Fno | 2.45 | $V_3/V_2$ | 1.01 |
| HFOV(deg.) | 37.5 | $f/f_2$ | −0.19 |
| $N_1$ | 1.544 | $R_1/R_2$ | 0.03 |

TABLE 2-3-continued

Embodiment 2

| $N_2$ | 1.640 | $f_2/f_3$ | 0.16 |
|---|---|---|---|
| $N_3$ | 1.607 | $T_{12}/T_{23}$ | 0.54 |
| $(V_1 - V_2)/(V_1 - V_3)$ | 1.01 | SL/TTL | 0.97 |

The Third Embodiment

Embodiment 3

Referring to FIGS. 3A to 3D, the lens assembly of optical imaging system 3 of the third embodiment comprises, from an object side to an image side along an optical axis in sequence, a first lens element 310, a stop, a second lens element 320, a third lens element 330, an IR-cut filter 340 and an image plane 360. The stop may be an aperture stop 300.

The first lens element 310 with positive refractive power has an aspheric convex object-side surface 311 near the optical axis and an aspheric convex image-side surface 312 near the optical axis. The first lens element 310 is made of plastic. The second lens element 320 with negative refractive power has an aspheric concave object-side surface 321 near the optical axis and an aspheric convex image-side surface 322 near the optical axis. The second lens element 320 is made of plastic. The second lens element 320 has an inclination toward the image side at the end part of a peripheral region within the effective radius of the image-side surface 322 of the second lens element 320. The third lens element 330 with negative refractive power has an aspheric convex object-side surface 331 and an aspheric image-side surface 332. The image-side surface 332 is concave near the optical axis and convex away from the optical axis. The third lens element 330 is made of plastic.

The detailed data of the lens assembly of optical imaging system 3 is as shown in Table 3-1 below.

TABLE 3-1

Embodiment 3
f = 1.82 mm, Fno = 2.35, HFOV = 35.1 deg.

| Surface # | | Curvature radius (mm) | | Thickness (mm) | Material | Index | Abbe # | Focal length (mm) |
|---|---|---|---|---|---|---|---|---|
| 0 | Object | — | Plano | Infinity | — | — | — | — |
| 1 | Lens 1 | 1.430 | ASP | 0.451 | Plastic | 1.544 | 55.9 | 1.55 |
| 2 | | −1.822 | ASP | −0.039 | — | — | — | — |
| 3 | Ape. Stop | — | Plano | 0.402 | — | — | — | — |

TABLE 3-1-continued

Embodiment 3
f = 1.82 mm, Fno = 2.35, HFOV = 35.1 deg.

| Surface # | | Curvature radius (mm) | Thickness (mm) | | Material | Index | Abbe # | Focal length (mm) |
|---|---|---|---|---|---|---|---|---|
| 4 | Lens 2 | −0.380 | ASP | 0.250 | Plastic | 1.634 | 23.8 | −141.63 |
| 5 | | −0.479 | ASP | 0.035 | | | | |
| 6 | Lens 3 | 1.649 | ASP | 0.472 | Plastic | 1.583 | 30.2 | −26.87 |
| 7 | | 1.334 | ASP | 0.400 | | | | |
| 8 | IR-cut filter | — | Plano | 0.210 | Glass | 1.517 | 64.2 | — |
| 9 | | — | Plano | 0.338 | | | | |
| 10 | Image Plane | — | Plano | — | — | — | — | — |

Note:
Reference wavelength is d-line 587.6 nm, and ASP represents aspheric.

As for the parameters of the aspheric surfaces, reference is made to Table 3-2 below.

TABLE 3-2

Aspheric Coefficients

| | Surface# | | |
|---|---|---|---|
| | 1 | 2 | 4 |
| k = | −3.0384E+01 | 0.0000E+00 | −2.3664E+00 |
| A4 = | 7.7565E−01 | −7.9091E−01 | −2.1639E+00 |
| A6 = | −6.4291E+00 | 2.6159E−01 | 1.5216E+01 |
| A8 = | 1.8678E+01 | −1.8495E+00 | 1.3337E+01 |
| A10 = | −4.2494E+01 | 6.7288E+00 | −1.5582E+02 |
| A12 = | 1.6334E+01 | −2.2654E−03 | 8.1037E+01 |

| | Surface# | | |
|---|---|---|---|
| | 5 | 6 | 7 |
| k = | −1.7849E+00 | −4.8870E+01 | −2.4714E+01 |
| A4 = | −5.0199E−01 | −6.3793E−02 | −3.7608E−01 |
| A6 = | 4.8500E+00 | 6.6765E−02 | 5.5953E−01 |
| A8 = | 1.5038E+01 | −4.5633E−02 | −7.0632E−01 |
| A10 = | −4.2773E+01 | 2.9114E−02 | 4.5002E−01 |
| A12 = | 1.1476E+00 | −2.5193E−02 | −1.3135E−01 |

The content of Table 3-3 may be deduced from Table 3-1.

TABLE 3-3

Embodiment 3

| f (mm) | 1.82 | $V_2 + V_3$ | 54.0 |
|---|---|---|---|
| Fno | 2.35 | $V_3/V_2$ | 1.27 |
| HFOV(deg.) | 35.1 | $f/f_2$ | −0.01 |
| $N_1$ | 1.544 | $R_1/R_2$ | −0.78 |
| $N_2$ | 1.634 | $f_2/f_3$ | 5.23 |

TABLE 3-3-continued

Embodiment 3

| $N_3$ | 1.583 | $T_{12}/T_{23}$ | 11.49 |
|---|---|---|---|
| $(V_1 - V_2)/(V_1 - V_3)$ | 1.25 | SL/TTL | 0.83 |

The Fourth Embodiment

Embodiment 4

Referring to FIGS. 4A to 4D, the lens assembly of optical imaging system 4 of the fourth embodiment comprises, from an object side to an image side along an optical axis in sequence, a stop, a first lens element 410, a second lens element 420, a third lens element 430, an IR-cut filter 440 and an image plane 460. The stop may be an aperture stop 400.

The first lens element 410 with positive refractive power has an aspheric convex object-side surface 411 near the optical axis and an aspheric image-side surface 412. The image-side surface 412 is concave near the optical axis and convex away from the optical axis. The first lens element 410 is made of plastic. The second lens element 420 with negative refractive power has an aspheric concave object-side surface 421 near the optical axis and an aspheric convex image-side surface 422 near the optical axis. The second lens element 420 is made of plastic. The second lens element 420 has an inclination toward the image side at the end part of a peripheral region within the effective radius of the image-side surface 422 of the second lens element 420. The third lens element 430 with negative refractive power has an aspheric convex object-side surface 431 and an aspheric image-side surface 432. The image-side surface 432 is concave near the optical axis and convex away from the optical axis. The third lens element 430 is made of plastic.

The detailed data of the lens assembly of optical imaging system 4 is as shown in Table 4-1 below.

TABLE 4-1

Embodiment 4
f = 1.65 mm, Fno = 2.70, HFOV = 37.7 deg.

| Surface # | | Curvature radius (mm) | Thickness (mm) | | Material | Index | Abbe # | Focal length (mm) |
|---|---|---|---|---|---|---|---|---|
| 0 | Object | — | Plano | Infinity | — | — | — | — |
| 1 | Ape. Stop | — | Plano | −0.051 | — | | | |
| 2 | Lens 1 | 0.760 | ASP | 0.314 | Plastic | 1.544 | 55.9 | 1.54 |
| 3 | | 6.801 | ASP | 0.285 | | | | |
| 4 | Lens 2 | −0.472 | ASP | 0.210 | Plastic | 1.640 | 23.3 | −45.24 |
| 5 | | −0.563 | ASP | 0.168 | | | | |

TABLE 4-1-continued

Embodiment 4
f = 1.65 mm, Fno = 2.70, HFOV = 37.7 deg.

| Surface # | | Curvature radius (mm) | | Thickness (mm) | Material | Index | Abbe # | Focal length (mm) |
|---|---|---|---|---|---|---|---|---|
| 6 | Lens 3 | 1.214 | ASP | 0.392 | Plastic | 1.614 | 25.6 | −76.17 |
| 7 | | 1.038 | ASP | 0.300 | | | | |
| 8 | IR-cut | — | Plano | 0.200 | Glass | 1.517 | 64.2 | — |
| 9 | filter | — | Plano | 0.243 | | | | |
| 10 | Image Plane | — | Plano | — | — | — | — | — |

Note:
Reference wavelength is d-line 587.6 nm, and ASP represents aspheric.

As for the parameters of the aspheric surfaces, reference is made to Table 4-2 below.

TABLE 4-2

Aspheric Coefficients

| | Surface# | | |
|---|---|---|---|
| | 2 | 3 | 4 |
| k = | −1.6659E−01 | −1.0000E+00 | −1.5794E+00 |
| A4 = | −2.0204E−01 | −2.8274E−01 | −3.3895E+00 |
| A6 = | 2.1933E+00 | −9.4442E+00 | 2.9879E+01 |
| A8 = | −1.9572E+01 | 7.9071E+01 | −6.0073E+02 |
| A10 = | −4.1762E+01 | −4.3088E+02 | 9.4106E+03 |
| A12 = | −1.2402E+03 | 1.3527E+03 | −6.7988E+04 |
| A14 = | 3.1477E+04 | −1.9546E+02 | 2.4179E+05 |
| A16 = | −1.2925E+05 | −1.5041E+04 | −3.6153E+05 |

| | Surface# | | |
|---|---|---|---|
| | 5 | 6 | 7 |
| k = | −1.1218E+00 | −1.7224E+01 | −4.8365E+00 |
| A4 = | −2.9874E+00 | −2.0258E+00 | −1.5617E+00 |
| A6 = | 3.1447E+01 | 8.0569E+00 | 3.5550E+00 |
| A8 = | −3.2326E+02 | −1.9271E+01 | −5.5816E+00 |
| A10 = | 2.7675E+03 | 2.9353E+01 | 5.5490E+00 |
| A12 = | −1.1687E+04 | −2.8364E+01 | −3.3930E+00 |
| A14 = | 2.5035E+04 | 1.5878E+01 | 1.1094E+00 |
| A16 = | −2.3494E+04 | −3.8846E+00 | −1.4783E−01 |

The content of Table 4-3 may be deduced from Table 4-1.

TABLE 4-3

Embodiment 4

| f (mm) | 1.65 | $V_2 + V_3$ | 48.9 |
|---|---|---|---|
| Fno | 2.70 | $V_3/V_2$ | 1.10 |
| HFOV(deg.) | 37.7 | $f/f_2$ | −0.04 |

TABLE 4-3-continued

Embodiment 4

| $N_1$ | 1.544 | $R_1/R_2$ | 0.11 |
|---|---|---|---|
| $N_2$ | 1.640 | $f_2/f_3$ | 0.61 |
| $N_3$ | 1.614 | $T_{12}/T_{23}$ | 1.70 |
| $(V_1 − V_2)/(V_1 − V_3)$ | 1.08 | SL/TTL | 0.98 |

The Fifth Embodiment

Embodiment 5

Referring to FIGS. 5A to 5D, the lens assembly of optical imaging system 5 of the fifth embodiment comprises, from an object side to an image side along an optical axis in sequence, a first lens element 510, a stop, a second lens element 520, a third lens element 530, an IR-cut filter 540 and an image plane 560. The stop may be an aperture stop 500.

The first lens element 510 with positive refractive power has an aspheric convex object-side surface 511 near the optical axis and an aspheric convex image-side surface 512 near the optical axis. The first lens element 510 is made of plastic. The second lens element 520 with negative refractive power has an aspheric concave object-side surface 521 near the optical axis and an aspheric convex image-side surface 522 near the optical axis. The second lens element 520 is made of plastic. The second lens element 520 has an inclination toward the image side at the end part of a peripheral region within the effective radius of the image-side surface 522 of the second lens element 520. The third lens element 530 with negative refractive power has an aspheric convex object-side surface 531 and an aspheric image-side surface 532. The image-side surface 532 is concave near the optical axis and convex away from the optical axis. The third lens element 530 is made of plastic.

The detailed data of the lens assembly of optical imaging system 5 is as shown in Table 5-1 below.

TABLE 5-1

Embodiment 5
f = 2.82 mm, Fno = 2.58, HFOV = 31.6 deg.

| Surface # | | Curvature radius (mm) | | Thickness (mm) | Material | Index | Abbe # | Focal length (mm) |
|---|---|---|---|---|---|---|---|---|
| 0 | Object | — | Plano | Infinity | — | — | — | — |
| 1 | Lens 1 | 1.653 | ASP | 0.528 | Plastic | 1.544 | 55.9 | 2.07 |
| 2 | | −3.117 | ASP | −0.068 | | | | |
| 3 | Ape. Stop | — | Plano | 0.489 | — | — | — | — |
| 4 | Lens 2 | −0.687 | ASP | 0.240 | Plastic | 1.634 | 23.8 | −6.33 |
| 5 | | −0.941 | ASP | 0.616 | | | | |
| 6 | Lens 3 | 1.914 | ASP | 0.584 | Plastic | 1.650 | 21.4 | −20.42 |

TABLE 5-1-continued

Embodiment 5
f = 2.82 mm, Fno = 2.58, HFOV = 31.6 deg.

| Surface # | | Curvature radius (mm) | Thickness (mm) | Material | Index | Abbe # | Focal length (mm) |
|---|---|---|---|---|---|---|---|
| 7 | | 1.472 ASP | 0.300 | | | | |
| 8 | IR-cut | — Plano | 0.300 | Glass | 1.517 | 64.2 | — |
| 9 | filter | — Plano | 0.412 | | | | |
| 10 | Image Plane | — Plano | — | — | — | — | — |

Note:
Reference wavelength is d-line 587.6 nm, and ASP represents aspheric.

As for the parameters of the aspheric surfaces, reference is made to Table 5-2 below.

TABLE 5-2

Aspheric Coefficients

| | Surface# | | |
|---|---|---|---|
| | 1 | 2 | 4 |
| k = | −7.6368E+00 | 1.9636E−01 | −1.4805E+00 |
| A4 = | 3.7375E−02 | −3.1481E−01 | −1.4855E−01 |
| A6 = | −1.9509E−01 | −4.4794E−01 | 9.9527E−01 |
| A8 = | −1.5605E+00 | 2.2946E+00 | 8.7122E+00 |
| A10 = | 3.6067E+00 | −6.8502E+00 | −2.9305E+01 |
| A12 = | −4.7412E+00 | 7.7828E+00 | 2.6425E+01 |

| | Surface# | | |
|---|---|---|---|
| | 5 | 6 | 7 |
| k = | −2.5717E+00 | −6.0079E−01 | −5.7951E+00 |
| A4 = | −1.5227E−01 | −3.3094E−01 | −1.5807E−01 |
| A6 = | 1.1881E+00 | 1.5975E−01 | 6.1468E−02 |
| A8 = | 2.1143E+00 | −4.6899E−02 | −3.0917E−02 |
| A10 = | −4.9754E+00 | 6.0024E−03 | 1.3806E−02 |
| A12 = | 2.0035E+00 | −1.7764E−02 | −5.6149E−03 |
| A14 = | — | 9.2404E−03 | 1.0127E−03 |

The content of Table 5-3 may be deduced from Table 5-1.

TABLE 5-3

Embodiment 5

| f (mm) | 2.82 | $V_2 + V_3$ | 45.2 |
|---|---|---|---|
| Fno | 2.58 | $V_3/V_2$ | 0.90 |
| HFOV(deg.) | 31.6 | $f/f_2$ | −0.45 |
| $N_1$ | 1.544 | $R_1/R_2$ | −0.53 |
| $N_2$ | 1.634 | $f_2/f_3$ | 0.31 |
| $N_3$ | 1.650 | $T_{12}/T_{23}$ | 0.68 |
| $(V_1 − V_2)/(V_1 − V_3)$ | 0.93 | SL/TTL | 0.86 |

The Sixth Embodiment

Embodiment 6

Referring to FIGS. 6A to 6D, the lens assembly of optical imaging system 6 of the sixth embodiment comprises, from an object side to an image side along an optical axis in sequence, a first lens element 610, a stop, a second lens element 620, a third lens element 630, an IR-cut filter 640 and an image plane 660. The stop may be an aperture stop 600.

The first lens element 610 with positive refractive power has an aspheric convex object-side surface 611 near the optical axis and an aspheric image-side surface 612. The image-side surface 612 is concave near the optical axis and convex away from the optical axis. The first lens element 610 is made of glass. The second lens element 620 with negative refractive power has an aspheric concave object-side surface 621 near the optical axis and an aspheric convex image-side surface 622 near the optical axis. The second lens element 620 is made of plastic. The second lens element 620 has an inclination toward the image side at the end part of a peripheral region within the effective radius of the image-side surface 622 of the second lens element 620. The third lens element 630 with negative refractive power has an aspheric convex object-side surface 631 and an aspheric image-side surface 632. The image-side surface 632 is concave near the optical axis and convex away from the optical axis. The third lens element 630 is made of plastic.

The detailed data of the lens assembly of optical imaging system 6 is as shown in Table 6-1 below.

TABLE 6-1

Embodiment 6
f = 2.82 mm, Fno = 2.70, HFOV = 31.6 deg.

| Surface # | | Curvature radius (mm) | Thickness (mm) | Material | Index | Abbe # | Focal length (mm) |
|---|---|---|---|---|---|---|---|
| 0 | Object | — Plano | Infinity | — | — | — | — |
| 1 | Lens 1 | 1.214 ASP | 0.379 | Glass | 1.566 | 61.1 | 2.16 |
| 2 | | 136.537 ASP | −0.002 | | | | |
| 3 | Ape. Stop | — Plano | 0.402 | — | — | — | — |
| 4 | Lens 2 | −0.828 ASP | 0.240 | Plastic | 1.633 | 23.4 | −7.08 |
| 5 | | −1.130 ASP | 0.664 | | | | |
| 6 | Lens 3 | 1.712 ASP | 0.540 | Plastic | 1.650 | 21.4 | −22.60 |
| 7 | | 1.342 ASP | 0.300 | | | | |
| 8 | IR-cut | — Plano | 0.300 | Glass | 1.517 | 64.2 | — |

TABLE 6-1-continued

Embodiment 6
f = 2.82 mm, Fno = 2.70, HFOV = 31.6 deg.

| Surface # | | Curvature radius (mm) | Thickness (mm) | Material | Index | Abbe # | Focal length (mm) |
|---|---|---|---|---|---|---|---|
| 9 | filter | — | Plano | 0.421 | | | |
| 10 | Image Plane | — | Plano | — | — | — | — |

Note:
Reference wavelength is d-line 587.6 nm, and ASP represents aspheric.

As for the parameters of the aspheric surfaces, reference is made to Table 6-2 below.

TABLE 6-2

Aspheric Coefficients

| | Surface# | | |
|---|---|---|---|
| | 1 | 2 | 4 |
| k = | −2.5966E+00 | 5.0000E+01 | −9.2304E−01 |
| A4 = | 8.5200E−02 | −2.6850E−01 | −2.7793E−01 |
| A6 = | −1.7422E+00 | −5.5916E−01 | 9.2850E−01 |
| A8 = | −1.5943E+00 | 8.9250E−01 | 8.0479E+00 |
| A10 = | 3.8075E+00 | −5.6444E+00 | −2.8352E+01 |
| A12 = | −8.3689E+00 | 9.2691E+00 | 3.1915E+01 |

| | Surface# | | |
|---|---|---|---|
| | 5 | 6 | 7 |
| k = | −2.4310E+00 | −1.3464E+00 | −5.9975E+00 |
| A4 = | −2.3809E−01 | −3.6264E−01 | −1.4843E−01 |
| A6 = | 1.1429E+00 | 1.5546E−01 | 2.0630E−02 |
| A8 = | 2.3010E+00 | −2.2942E−02 | −4.6808E−03 |
| A10 = | −4.6121E+00 | −4.9670E−06 | 1.1411E−02 |
| A12 = | 2.7556E+00 | −2.4323E−02 | −9.1800E−03 |
| A14 = | — | 1.3590E−02 | 2.0862E−03 |

The content of Table 6-3 may be deduced from Table 6-1.

TABLE 6-3

Embodiment 6

| f (mm) | 2.82 | $V_2 + V_3$ | 44.8 |
|---|---|---|---|
| Fno | 2.70 | $V_3/V_2$ | 0.91 |
| HFOV(deg.) | 31.6 | $f/f_2$ | −0.40 |
| $N_1$ | 1.566 | $R_1/R_2$ | 0.01 |
| $N_2$ | 1.633 | $f_2/f_3$ | 0.31 |
| $N_3$ | 1.650 | $T_{12}/T_{23}$ | 0.60 |
| $(V_1 − V_2)/(V_1 − V_3)$ | 0.95 | SL/TTL | 0.88 |

The Seventh Embodiment

Embodiment 7

Referring to FIGS. 7A to 7D, the lens assembly of optical imaging system 7 of the seventh embodiment comprises, from an object side to an image side along an optical axis in sequence, a first lens element 710, a stop, a second lens element 720, a third lens element 730, an IR-cut filter 740 and an image plane 760. The stop may be an aperture stop 700.

The first lens element 710 with positive refractive power has an aspheric convex object-side surface 711 near the optical axis and an aspheric convex image-side surface 712 near the optical axis. The first lens element 710 is made of plastic. The second lens element 720 with negative refractive power has an aspheric concave object-side surface 721 near the optical axis and an aspheric convex image-side surface 722 near the optical axis. The second lens element 720 is made of plastic. The second lens element 720 has an inclination toward the image side at the end part of a peripheral region within the effective radius of the image-side surface 722 of the second lens element 720. The third lens element 730 with negative refractive power has an aspheric convex object-side surface 731 and an aspheric image-side surface 732. The image-side surface 732 is concave near the optical axis and convex away from the optical axis. The third lens element 730 is made of plastic.

The detailed data of the lens assembly of optical imaging system 7 is as shown in Table 7-1 below.

TABLE 7-1

Embodiment 7
f = 2.79 mm, Fno = 2.58, HFOV = 31.6 deg.

| Surface # | | Curvature radius (mm) | Thickness (mm) | Material | Index | Abbe # | Focal length (mm) |
|---|---|---|---|---|---|---|---|
| 0 | Object | — | Plano | Infinity | — | — | — |
| 1 | Lens 1 | 1.591 | ASP | 0.441 | Plastic | 1.544 | 55.9 | 2.14 |
| 2 | | −3.904 | ASP | −0.050 | | | | |
| 3 | Ape. Stop | — | Plano | 0.496 | — | | | |
| 4 | Lens 2 | −0.659 | ASP | 0.240 | Plastic | 1.634 | 23.8 | −12.80 |
| 5 | | −0.819 | ASP | 0.534 | | | | |
| 6 | Lens 3 | 3.210 | ASP | 0.596 | Plastic | 1.650 | 21.4 | −12.99 |
| 7 | | 2.155 | ASP | 0.300 | | | | |
| 8 | IR-cut | — | Plano | 0.300 | Glass | 1.517 | 64.2 | — |
| 9 | filter | — | Plano | 0.505 | | | | |
| 10 | Image Plane | — | Plano | — | — | | | |

Note:
Reference wavelength is d-line 587.6 nm, and ASP represents aspheric.

As for the parameters of the aspheric surfaces, reference is made to Table 7-2 below.

TABLE 7-3

Aspheric Coefficients

| | Surface# | | |
|---|---|---|---|
| | 1 | 2 | 4 |
| k = | −7.4362E+00 | 4.1493E+00 | −1.7739E+00 |
| A4 = | 3.0852E−02 | −3.1674E−01 | −1.1137E−01 |
| A6 = | −2.6463E−01 | −4.9808E−01 | 9.0587E−01 |
| A8 = | −1.7229E+00 | 2.0498E+00 | 8.7257E+00 |
| A10 = | 3.8595E+00 | −6.0663E+00 | −2.7405E+01 |
| A12 = | −5.4254E+00 | 6.7152E+00 | 2.3479E+01 |

| | Surface# | | |
|---|---|---|---|
| | 5 | 6 | 7 |
| k = | −3.2695E+00 | 3.9723E−01 | −5.8561E+00 |
| A4 = | −2.2548E−01 | −1.8281E−01 | −1.4008E−01 |
| A6 = | 1.2717E+00 | 2.2711E−02 | 5.8836E−02 |
| A8 = | 2.5010E+00 | 1.3948E−02 | −3.7016E−02 |
| A10 = | −5.3388E+00 | 2.5526E−03 | 1.6238E−02 |
| A12 = | 2.0688E+00 | −3.3787E−02 | −5.4103E−03 |
| A14 = | — | 1.7281E−02 | 8.0864E−04 |

The content of Table 7-3 may be deduced from Table 7-1.

TABLE 7-3

Embodiment 7

| f (mm) | 2.79 | $V_2 + V_3$ | 45.2 |
|---|---|---|---|
| Fno | 2.58 | $V_3/V_2$ | 0.90 |
| HFOV(deg.) | 31.6 | $f/f_2$ | −0.22 |
| $N_1$ | 1.544 | $R_1/R_2$ | −0.41 |
| $N_2$ | 1.634 | $f_2/f_3$ | 0.99 |

TABLE 7-3-continued

Embodiment 7

| $N_3$ | 1.650 | $T_{12}/T_{23}$ | 1.02 |
|---|---|---|---|
| $(V_1 − V_2)/(V_1 − V_3)$ | 0.93 | SL/TTL | 0.88 |

The Eighth Embodiment

Embodiment 8

Referring to FIGS. 8A to 8D, the lens assembly of optical imaging system 8 of the eighth embodiment comprises, from an object side to an image side along an optical axis in sequence, a stop, a first lens element 810, a second lens element 820, a third lens element 830, an IR-cut filter 840 and an image plane 860. The stop may be an aperture stop 800.

The first lens element 810 with positive refractive power has an aspheric convex object-side surface 811 near the optical axis and an aspheric image-side surface 812. The image-side surface 812 is concave near the optical axis and convex away from the optical axis. The first lens element 810 is made of plastic. The second lens element 820 with negative refractive power has an aspheric concave object-side surface 821 near the optical axis and an aspheric convex image-side surface 822 near the optical axis. The second lens element 820 is made of plastic. The second lens element 820 has an inclination toward the image side at the end part of a peripheral region within the effective radius of the image-side surface 822 of the second lens element 820. The third lens element 830 with negative refractive power has an aspheric convex object-side surface 831 and an aspheric image-side surface 832. The image-side surface 832 is concave near the optical axis and convex away from the optical axis. The third lens element 830 is made of plastic.

The detailed data of the lens assembly of optical imaging system 8 is as shown in Table 8-1 below.

TABLE 8-1

Embodiment 8
f = 1.54 mm, Fno = 2.75, HFOV = 33.0 deg.

| Surface # | | Curvature radius (mm) | Thickness (mm) | Material | Index | Abbe # | Focal length (mm) |
|---|---|---|---|---|---|---|---|
| 0 | Object | — | Plano | Infinity | — | — | — |
| 1 | Ape. Stop | — | Plano | −0.056 | Plastic | — | — |
| 2 | Lens 1 | 0.627 ASP | 0.346 | Plastic | 1.544 | 55.9 | 1.16 |
| 3 | | 100.000 ASP | 0.194 | | | | |
| 4 | Lens 2 | −0.502 ASP | 0.200 | Plastic | 1.640 | 23.3 | −7.28 |
| 5 | | −0.650 ASP | 0.113 | | | | |
| 6 | Lens 3 | 0.991 ASP | 0.240 | Plastic | 1.640 | 23.3 | −4.94 |
| 7 | | 0.683 ASP | 0.100 | | | | |
| 8 | IR-cut | — | Plano | 0.200 | Glass | 1.517 | 64.2 | — |
| 9 | filter | — | Plano | 0.050 | | | | |
| 10 | Cover Glass | — | Plano | 0.400 | Glass | 1.517 | 64.2 | — |
| 11 | | — | Plano | 0.094 | | | | |
| 12 | Image Plane | — | Plano | — | — | — | — |

Note:
Reference wavelength is d-line 587.6 nm, and ASP represents aspheric.

As for the parameters of the aspheric surfaces, reference is made to Table 8-2 below.

TABLE 8-2

Aspheric Coefficients

| | Surface# | | |
|---|---|---|---|
| | 2 | 3 | 4 |
| k = | −1.1578E+00 | 1.0000E+01 | −3.6649E−01 |
| A4 = | 7.8930E−02 | −2.3292E−01 | 9.5095E−01 |
| A6 = | 1.6169E+01 | −3.5679E+01 | 3.5809E+00 |
| A8 = | −4.0576E+02 | 6.8596E+02 | 5.9396E+00 |
| A10 = | 4.5534E+03 | −7.4025E+03 | 1.0365E+03 |
| A12 = | −2.1234E+04 | 2.4192E+04 | −1.7553E+04 |

| | Surface# | | |
|---|---|---|---|
| | 5 | 6 | 7 |
| k = | 8.4237E−01 | −3.3110E+01 | −9.8307E+00 |
| A4 = | 2.4574E−01 | −2.0122E+00 | −1.4439E+00 |
| A6 = | 2.6315E+01 | 4.9169E+00 | 3.0523E+00 |
| A8 = | −5.5614E+01 | −7.4963E+00 | −6.3650E+00 |
| A10 = | 5.7539E+02 | 7.8734E+00 | 7.0920E+00 |
| A12 = | −3.9494E+03 | 6.4906E+00 | 2.9985E−01 |
| A14 = | 8.4988E+03 | 1.2002E+01 | −1.4294E+01 |
| A16 = | — | −5.1745E+01 | 1.6203E+01 |

The content of Table 8-3 may be deduced from Table 8-1.

TABLE 8-3

Embodiment 8

| f (mm) | 1.54 | $V_2 + V_3$ | 46.6 |
|---|---|---|---|
| Fno | 2.75 | $V_3/V_2$ | 1.00 |
| HFOV(deg.) | 33.0 | $f/f_2$ | −0.21 |
| $N_1$ | 1.544 | $R_1/R_2$ | 0.01 |
| $N_2$ | 1.640 | $f_2/f_3$ | 1.47 |
| $N_3$ | 1.640 | $T_{12}/T_{23}$ | 1.72 |
| $(V_1 − V_2)/(V_1 − V_3)$ | 1.00 | SL/TTL | 0.97 |

Figure 9B:
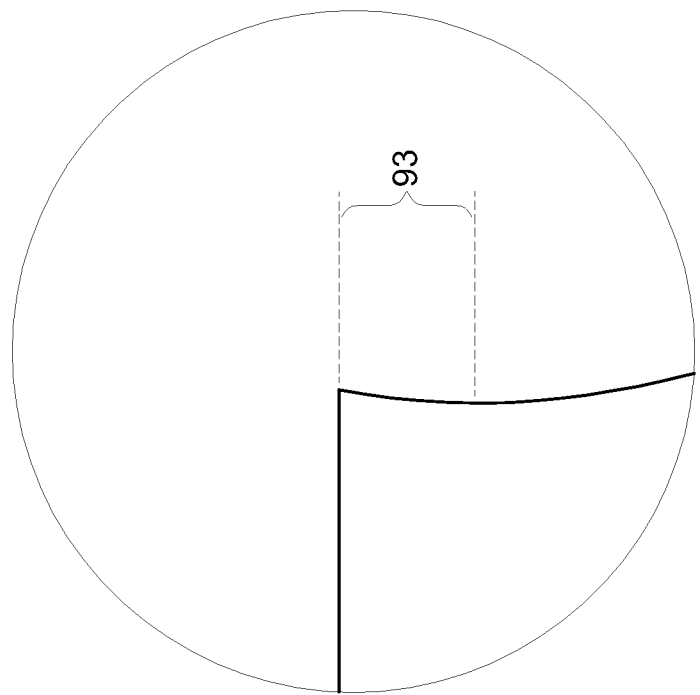
FIG. 9B is a partial enlargement view of the image-side surface of the second lens element in FIG. 9A.
Figure 9A:
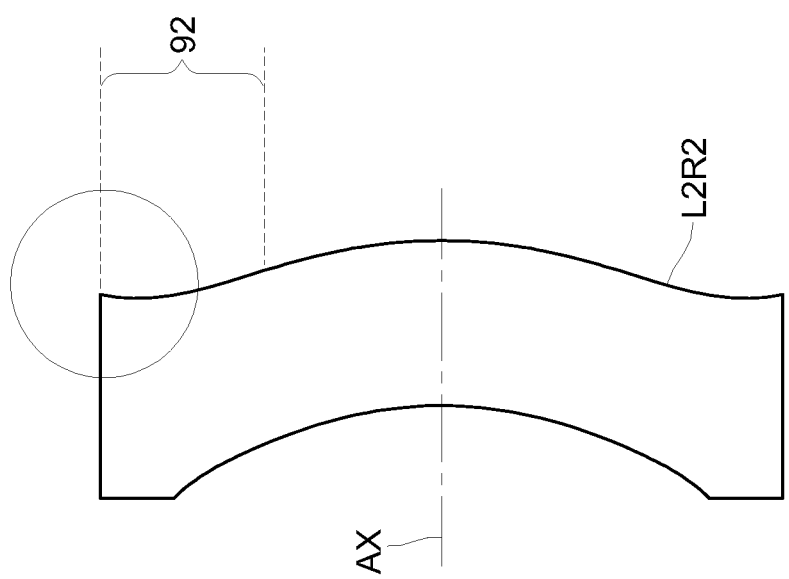
FIG. 9A is a schematic structural view of a second lens element of a lens assembly of optical imaging system.

In the above-mentioned embodiments, as shown in FIGS. 9A and 9B, AX represents the optical axis. The image-side surface L2R2 of the second lens element has a peripheral region 92. The peripheral region 92 includes a terminal section 93. The terminal section 93 has an inclination in the direction from the optical axis toward the peripheral region 92. The inclination of the surface is inclined towards the image plane (not shown) or the image side (not shown) of the lens assembly of optical imaging system away from the optical axis.

It is to be noted that TABLES 1-8 show different data of the different embodiments, however, the data of the different embodiments are obtained from experiments. Therefore, any optical imaging system of the same structure is considered to be within the scope of the present disclosure even if it uses different data. The embodiments depicted above and the appended drawings are exemplary and are not intended to limit the scope of the present disclosure.

What is claimed is:

1. A lens assembly of optical imaging system comprising, in order from an object side to an image side:
a first lens element with positive refractive power having an object-side surface near an optical axis being convex;
a second lens element with negative refractive power having an object-side surface near the optical axis being concave, which is made of plastic and has both of the object-side surface and an image-side surface being aspheric; and
a third lens element with negative refractive power having an image-side surface being concave near the optical axis and convex away from the optical axis, which is made of plastic and has both of an object-side surface and the image-side surface being aspheric;
the lens assembly of optical imaging system satisfying the following conditions:

$0.7<(V_1-V_2)/(V_1-V_3)<1.5;$ $30<V_2+V_3<65;$ $0.70<V_3/V_2\leq1.10;$ and $-0.22<f/f_2<0,$ wherein $V_1$ is an Abbe number of the first lens element, $V_2$ is an Abbe number of the second lens element, $V_3$ is an Abbe number of the third lens element, f is a focal length of the lens assembly of optical imaging system, and $f_2$ is a focal length of the second lens element.

2. The lens assembly of optical imaging system according to claim 1, wherein the image-side surface of the second lens element is convex near the optical axis and the object-side surface of the third lens element is convex near the optical axis.

3. The lens assembly of optical imaging system according to claim 2, wherein the lens assembly of optical imaging system satisfies the following condition:

$35<V_2+V_3<55,$ wherein $V_2$ is the Abbe number of the second lens element, and $V_3$ is the Abbe number of the third lens element.

4. The lens assembly of optical imaging system according to claim 3, wherein the first lens element has an image-side surface and the lens assembly of optical imaging system satisfies the following condition:

$-1.0<R_1/R_2<0.20,$ wherein $R_1$ is a curvature radius of the object-side surface of the first lens element, and $R_2$ is a curvature radius of the image-side surface of the first lens element.

5. The lens assembly of optical imaging system according to claim 4, wherein the lens assembly of optical imaging system satisfies the following condition:

$0.08<f_2/f_3<2.0,$ wherein $f_2$ is the focal length of the second lens element, and $f_3$ is a focal length of the third lens element.

6. The lens assembly of optical imaging system according to claim 3, wherein the first lens element has an image-side surface being concave near the optical axis, and the lens assembly of optical imaging system comprises a stop and satisfies the following condition:

$0.93<SL/TTL<1.05,$ wherein SL is an axial distance between the stop and an image plane, and TTL is an axial distance between the object-side surface of the first lens element and the image plane.

7. The lens assembly of optical imaging system according to claim 6, wherein the image-side surface of the first lens element is convex away from the optical axis.

8. The lens assembly of optical imaging system according to claim 7, wherein the lens assembly of optical imaging system satisfies the following condition:

$0.5<T_{12}/T_{23}<2.0,$ wherein $T_{12}$ is an axial distance between the first lens element and the second lens element, and $T_{23}$ is an axial distance between the second lens element and the third lens element.

9. The lens assembly of optical imaging system according to claim 6, wherein the lens assembly of optical imaging system satisfies the following condition:

$0<R_1/R_2<0.10$, wherein $R_1$ is a curvature radius of the object-side surface of the first lens element, and $R_2$ is a curvature radius of the image-side surface of the first lens element.

10. The lens assembly of optical imaging system according to claim 3, wherein the second lens element has an inclination toward the image side at an end part of a peripheral region within an effective radius of the image-side surface of the second lens element.

11. The lens assembly of optical imaging system according to claim 3, wherein the lens assembly of optical imaging system satisfies the following condition:

$40<V_2+V_3<49$, wherein $V_2$ is the Abbe number of the second lens element, and $V_3$ is the Abbe number of the third lens element.

12. The lens assembly of optical imaging system according to claim 3, wherein the lens assembly of optical imaging system satisfies the following conditions:

$N_1<N_2$;

$N_1<N_3$;

$1.60<N_2$; and $1.60<N_3$, wherein $N_1$ is an index of refraction of the first lens element, $N_2$ is an index of refraction of the second lens element, and $N_3$ is an index of refraction of the third lens element.

13. A lens assembly of optical imaging system comprising, in order from an object side to an image side:

a first lens element with positive refractive power having an object-side surface near an optical axis being convex;

a second lens element with negative refractive power having an object-side surface near the optical axis being concave, which is made of plastic and has the object-side surface and an image-side surface being aspheric; and a third lens element with negative refractive power having an image-side surface being concave near the optical axis and convex away from the optical axis, which is made of plastic and has an object-side surface and the image-side surface being aspheric, wherein the object-side surface of the third lens element is convex near the optical axis;

the lens assembly of optical imaging system satisfying the following conditions:

$0.7<(V_1-V_2)/(V_1-V_3)<1.5$;

$30<V_2+V_3<65$;

$-0.45<f/f_2<0$; and $0.70<V_3/V_2\le1.10$, wherein $V_1$ is an Abbe number of the first lens element, $V_2$ is an Abbe number of the second lens element, $V_3$ is an Abbe number of the third lens element, f is a focal length of the lens assembly of optical imaging system, and $f_2$ is a focal length of the second lens element.

14. The lens assembly of optical imaging system according to claim 13, wherein the image-side surface of the second lens element is convex near the optical axis.

15. The lens assembly of optical imaging system according to claim 14, wherein the lens assembly of optical imaging system satisfies the following condition:

$35<V_2+V_3<55$, wherein $V_2$ is the Abbe number of the second lens element, and $V_3$ is the Abbe number of the third lens element.

16. The lens assembly of optical imaging system according to claim 15, wherein the first lens element has an image-side surface and the lens assembly of optical imaging system satisfies the following condition:

$-0.8<R_1/R_2<0.2$, wherein $R_1$ is a curvature radius of the object-side surface of the first lens element, and $R_2$ is a curvature radius of the image-side surface of the first lens element.

17. The lens assembly of optical imaging system according to claim 16, wherein the second lens element has an inclination toward the image side at an end part of a peripheral region within an effective radius of the image-side surface of the second lens element.

18. The lens assembly of optical imaging system according to claim 17, wherein the lens assembly of optical imaging system satisfies the following condition:

$40<V_2+V_3<49$, wherein $V_2$ is the Abbe number of the second lens element, and $V_3$ is the Abbe number of the third lens element.

19. The lens assembly of optical imaging system according to claim 17, wherein the lens assembly of optical imaging system satisfies the following condition:

$-0.30<f/f_2<0$, wherein f is the focal length of the lens assembly of optical imaging system, and $f_2$ is the focal length of the second lens element.

20. The lens assembly of optical imaging system according to claim 19, wherein the lens assembly of optical imaging system satisfies the following condition:

$0.5<T_{12}/T_{23}<2.0$, wherein $T_{12}$ is an axial distance between the first lens element and the second lens element, and $T_{23}$ is an axial distance between the second lens element and the third lens element.

21. The lens assembly of optical imaging system according to claim 15, wherein the first lens element has an image-side surface being concave near the optical axis and convex away from the optical axis.

22. The lens assembly of optical imaging system according to claim 21, wherein the lens assembly of optical imaging system satisfies the following condition:

$0.08<f_2/f_3<2.0$, wherein $f_2$ is the focal length of the second lens element, and $f_3$ is a focal length of the third lens element.

23. The lens assembly of optical imaging system according to claim 15, wherein the lens assembly of optical imaging system satisfies the following condition:

$0.7<(V_1-V_2)/(V_1-V_3)\le1.25$, wherein $V_1$ is the Abbe number of the first lens element, $V_2$ is the Abbe number of the second lens element, and $V_3$ is the Abbe number of the third lens element.

* * * * *